(12) United States Patent
Ikuhara et al.

(10) Patent No.: US 6,515,811 B2
(45) Date of Patent: Feb. 4, 2003

(54) OPTICAL FILTER HAVING TWO ABSORPTION MAXIMUMS

(75) Inventors: Isao Ikuhara, Minami-ashigara (JP); Toru Harada, Minami-ashigara (JP); Takumi Ando, Minami-ashigara (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 90 days.

(21) Appl. No.: 09/759,297

(22) Filed: Jan. 16, 2001

(65) Prior Publication Data

US 2001/0053034 A1 Dec. 20, 2001

(30) Foreign Application Priority Data

Jan. 13, 2000 (JP) .......................... 2000-010038
Feb. 18, 2000 (JP) .......................... 2000-040694

(51) Int. Cl.⁷ ................................. G02B 5/22
(52) U.S. Cl. ................. 359/885; 359/887; 313/489; 252/582; 348/832
(58) Field of Search ................. 359/885, 887, 359/589, 350; 313/586, 587, 478, 489; 252/582; 345/72; 356/419; 348/832, 834

(56) References Cited

U.S. PATENT DOCUMENTS 5,024,923 A * 6/1991 Suzuki .......................... 359/885
6,183,944 B1 * 2/2001 Helber ......................... 430/517
2002/0005509 A1 * 1/2002 Teng ........................... 252/582

OTHER PUBLICATIONS

Encyclopaedia Britannica Online, "cyanine dye".*

* cited by examiner

*Primary Examiner*—Cassandra Spyrou
*Assistant Examiner*—Leo Boutsikaris
(74) *Attorney, Agent, or Firm*—Burns, Doane, Swecker & Mathis, LLP

(57) ABSTRACT

An optical filter comprises a transparent support and at least one filter layer. The optical filter has an absorption maximum in the wavelength region of 560 to 620 nm. The optical filter also has another absorption maximum in the wavelength region of 700 to 1,200 nm. A plasma display panel having a display surface covered with an optical filter is also disclosed.

9 Claims, 4 Drawing Sheets

6,515,811 B2

OPTICAL FILTER HAVING TWO ABSORPTION MAXIMUMS

FIELD OF THE INVENTION

The present invention relates to an optical filter comprising a transparent support and a filter layer. In detail, the invention relates to an optical filter used in a display device such as a plasma display panel (PDP), a liquid crystal display device (LCD), an electroluminescence display (ELD), a fluorescent indicator tube or a field emission display to improve the color reproducibility and to prevent the device from causing faulty working of remote-controlled apparatus.

BACKGROUND OF THE INVENTION

A display device such as a liquid crystal display device (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (practically impossible) to use the ideal three primary colors. For example, the plasma display panel uses phosphors of the three primary colors, which emit light containing an unnecessary component (in the wavelength region of 560 to 620 nm). Therefore, it has been proposed to correct the color balance of the displayed image by an optical filter absorbing the unnecessary component. The optical filter for the color correction is described in Japanese Patent Provisional Publication Nos. 58(1983)-153904, 61(1986)-188501, 3(1991)-231988, 5(1993)-205643, 9(1997)-145918, 9(1997)-306366 and 10(1998)-26704.

Further, it has been reported that infrared rays (mainly in the wavelength region of 750 to 1,100 nm) emitted from the display device may cause faulty working of remote-controlled apparatus. For solving this problem, an infrared rays-absorbing filter is used. Dyes used in the infrared rays-absorbing filter are described in U.S. Pat. No. 5,945,209.

SUMMARY OF THE INVENTION

An object of the present invention is to provide an optical filter selectively removing both infrared rays and light lowering the color purity of displayed images.

Another object of the invention is to provide a plasma display panel which gives corrected color balance and which is prevented from causing faulty working of remote-controlled apparatus.

The present invention provides an optical filter which comprises a transparent support and at least one filter layer, wherein the optical filter has an absorption maximum in the wavelength region of 560 to 620 nm and another absorption maximum in the wavelength region of 700 to 1,200 nm.

The invention also provides a plasma display panel having a display surface covered with an optical filter, wherein the optical filter comprises a transparent support and at least one filter layer, said optical filter having an absorption maximum in the wavelength region of 560 to 620 nm and another absorption maximum in the wavelength region of 700 to 1,200 nm.

The invention further provides a plasma display panel having a display surface covered with an optical filter, wherein the optical filter comprises a transparent support, a first filter layer and a second filter layer, said first filter layer having an absorption maximum in the wavelength region of 560 to 620 nm, and said second filter layer having an absorption maximum in the wavelength region of 700 to 1,200 nm.

DETAILED DESCRIPTION OF THE INVENTION

[Layered Structure]

Figure 1:
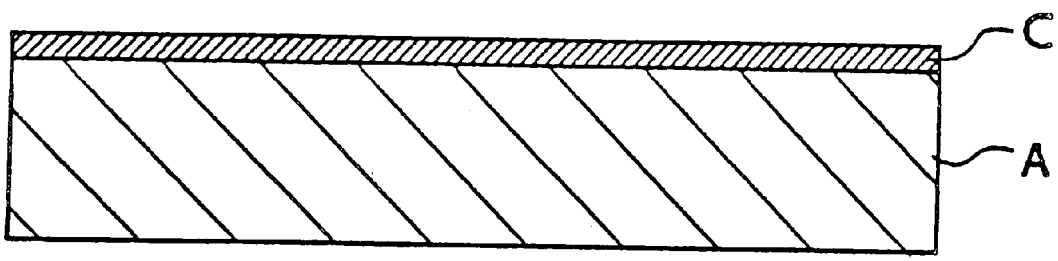
FIG. 1 is a sectional view schematically illustrating a layered structure of a plasma display panel having an optical filter.

FIG. 1 is a sectional view schematically illustrating a layered structure of a plasma display panel having an optical filter.

The plasma display panel (A) shown in FIG. 1 has a display surface covered with an optical filter (C). The optical filter (C) is directly attached to the display surface.

Figure 2:
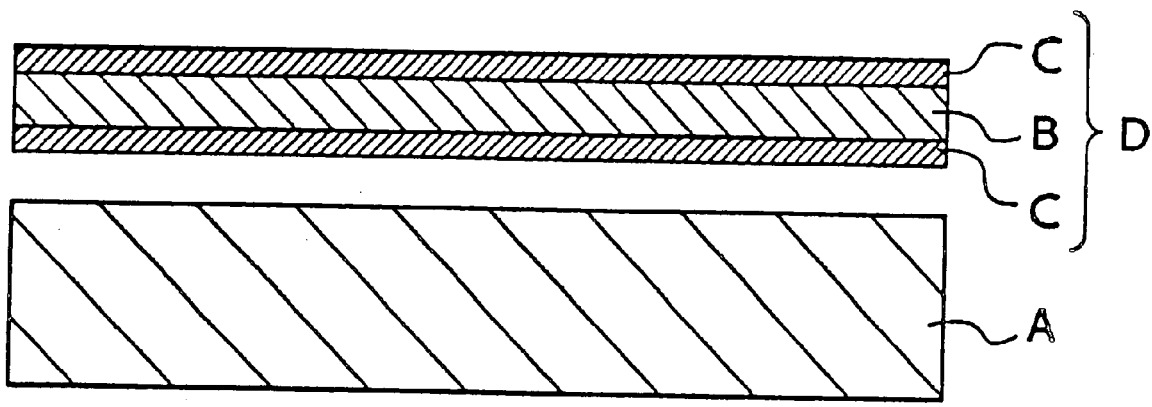
FIG. 2 is a sectional view schematically illustrating another layered structure of a plasma display panel having an optical filter.

FIG. 2 is a sectional view schematically illustrating another layered structure of a plasma display panel having an optical filter.

The plasma display panel (A) shown in FIG. 2 has a display surface covered with a front plate (D). A space intervenes between the plasma display panel (A) and the front plate (D). The front plate (D) comprises two optical filters (C) and a support.

The embodiment shown in FIG. 1 is preferred to the embodiment shown in FIG. 2. In other words, the optical filter is preferably attached to the display surface directly without the front plate.

Figure 3:
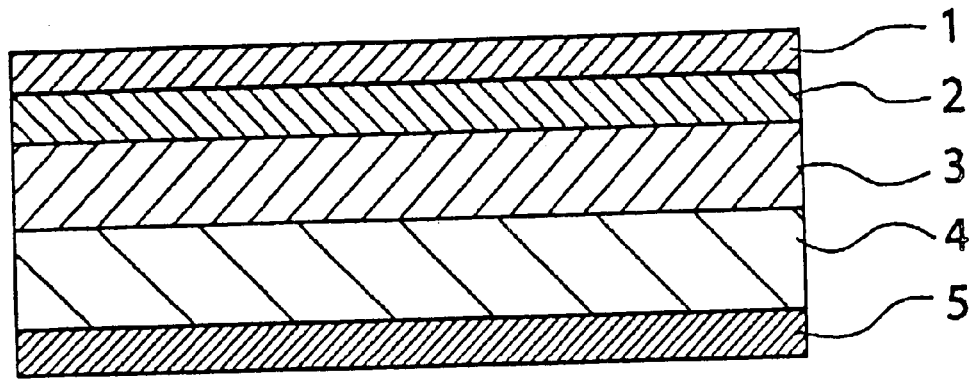
FIG. 3 is a sectional view schematically illustrating a layered structure of an optical filter.

FIG. 3 is a sectional view schematically illustrating a layered structure of an optical filter. The optical filter can be attached to the plasma display panel, as is shown in FIG. 1.

The optical filter shown in FIG. 3 comprises an antireflection layer (1), a second filter layer (2), a hard coating layer (3), a transparent polymer film support (4) and a first filter layer (5) in the order.

Figure 4:
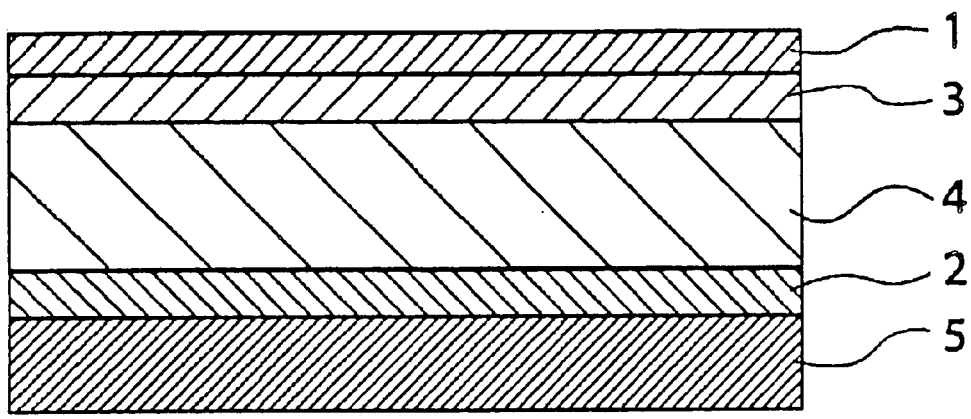
FIG. 4 is a sectional view schematically illustrating another layered structure of an optical filter.

FIG. 4 is a sectional view schematically illustrating another layered structure of an optical filter. The optical filter can be attached to the plasma display panel, as is shown in FIG. 1.

The optical filter shown in FIG. 4 comprises an antireflection layer (1), a second filter layer (2), a hard coating layer (3), a transparent polymer film support (4) and a first filter layer (5) in the order.

The optical filter shown in FIG. 4 comprises an antireflection layer (1), a hard coating layer (3), a transparent polymer film support (4), a second filter layer (2) and a first filter layer (5) in the order.

Figure 5:
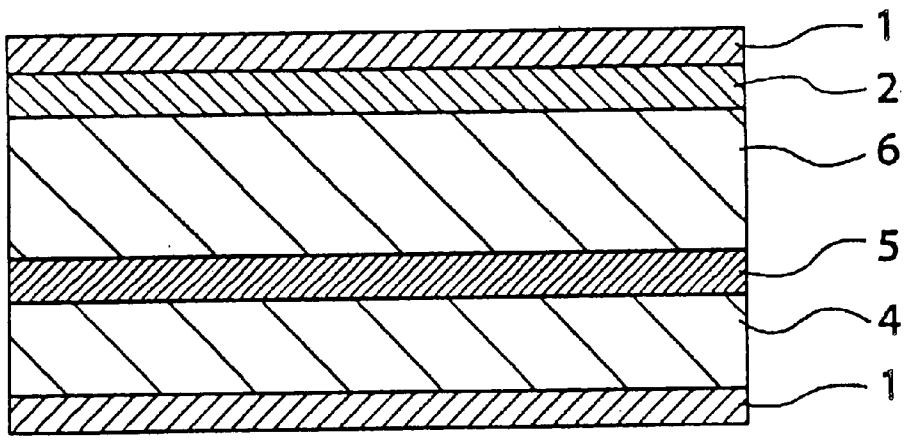
FIG. 5 is a sectional view schematically illustrating a layered structure of a front plate having an optical filter.

FIG. 5 is a sectional view schematically illustrating a layered structure of a front plate having an optical filter. The front plate can be attached to the plasma display panel, as is shown in FIG. 2.

The front plate shown in FIG. 5 comprises an antireflection layer (1), a second filter layer (2), a glass plate support (6), a first filter layer (5), a transparent support (4) and an antireflection layer (1) in the order.

Figure 6:
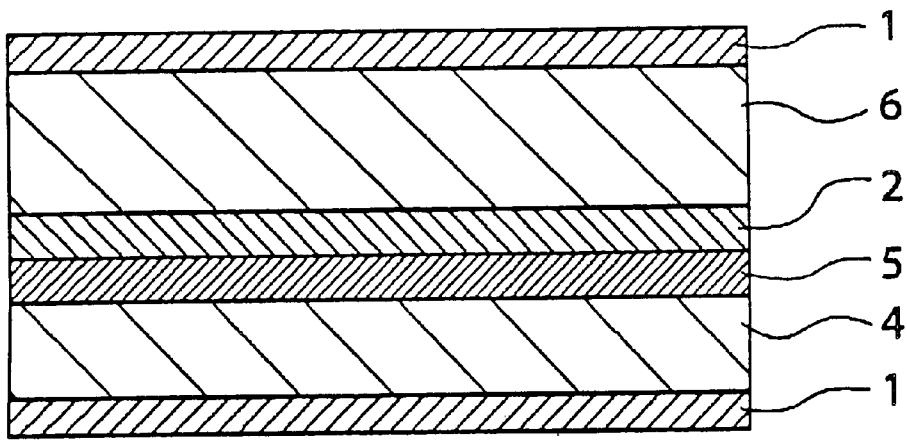
FIG. 6 is a sectional view schematically illustrating another layered structure of a front plate having an optical filter.

FIG. 6 is a sectional view schematically illustrating another layered structure of a front plate having an optical filter. The front plate can be attached to the plasma display panel, as is shown in FIG. 2.

The front plate shown in FIG. 6 comprises an antireflection layer (1), a glass plate support (6), a second filter layer (2), a first filter layer (5), a transparent support (4) and an antireflection layer (1) in the order.

[Filter Layer]

The optical filter has an absorption maximum in the wavelength region of 560 to 620 nm and another absorption maximum in the wavelength region of 700 to 1,200 nm. The absorption maximums are preferably obtained by at least one filter layer having the absorption maximums.

The filter layer can consist of a single layer having the two absorption maximums (the first embodiment of the invention). The filter layer can also consist of two layers, one of which has an absorption maximum in the wavelength of 560 to 620 nm and the other of which has an absorption maximum in the wavelength of 700 to 1,200 nm (the second embodiment of the invention). The transmittance at each absorption maximum is preferably in the range of 0.01 to 90%, and more preferably in the range of 0.1 to 70%. The transmittance at 800 nm is more preferably less than 15%, and the transmittance at 850 nm is more preferably less than 10%, and most preferably less than 5%.

The filter layer usually contains dyes or pigments, and preferably contains dyes to obtain at least two absorption maximums.

Accordingly, a dye having the absorption maximum in the wavelength region of 560 to 620 nm is preferably used in the filter layer. The absorption spectrum of the dye preferably has such a sharp peak that the filter can selectively cut unfavorable light off without affecting green luminescence of the display. In more detail, the half-width of the peak is preferably in the range of 5 to 100 nm, more preferably in the range of 10 to 70 nm, and most preferably in the range of 10 to 50 nm.

A dye having the absorption maximum in the wavelength region of 700 to 1,200 nm is also preferably used in the filter layer. The dye preferably absorbs visible light (in the wavelength region of 400 to 700 nm) so little that the filter may not lower brightness of displayed images.

The filter preferably contains the dyes in an aggregated form to obtain the above-described preferred absorption spectrum.

The dye in the aggregated form has a sharp absorption peak because the aggregated dye forms a so-called J-band. Various publications (e.g., Photographic Science and Engineering Vol. 18, No 323–335(1974)) describe the aggregated dye and the J-band. The aggregated dye generally has the absorption maximum at a longer wavelength than the dye in a solution. Accordingly, it can be easily determined by the position of the absorption maximum whether the dye is in an aggregated form or not.

In the present specification, the dye giving the absorption maximum at a wavelength longer than the dye in a solution by 30 nm or more is regarded as being in an aggregated form. The wavelength shift is preferably not less than 30 nm, more preferably not less than 40 nm, and most preferably not less than 45 nm.

Some dyes form aggregates when they are only dissolved in water, but generally aggregates are formed by adding gelatin or salts (e.g., barium chloride, potassium chloride, sodium chloride, calcium chloride) into an aqueous solution of the dye. It is particularly preferred to add gelatin into the aqueous solution.

The aggregates of dye may be in the form of dispersion of solid fine particles, which can be prepared by means of known dispersing machines. Examples of the dispersing machines include a ball mill, an oscillating ball mill, a planetary ball mill, a sand mill, a colloid mill, a jet mill and a roll mill. Japanese Patent Provisional Publication No. 52(1977)-92716 and International Patent No. 88/074794 describe dispersing machines. A vertical or horizontal medium dispersing machine is preferred.

The dispersion can be prepared in the presence of a medium (e.g., water, alcohols). A dispersing surface active agent is preferably used for dispersing. Anionic surface active agents (described in Japanese Patent Provisional Publication No. 52(1977)-92716 and International Patent No. 88/074794) are preferably used as the dispersing surface active agent. Further, anionic polymers, nonionic surface active agents or cationic surface active agents may be used, if needed.

Powder of the dye fine particles can be also obtained by dissolving the dye in an appropriate solvent and adding a poor solvent to precipitate the fine particles. The above dispersing surface active agent can be also used in this case. Crystallites of the dye, which are aggregates of the dye, can be also obtained by the steps of dissolving the dye by adjusting pH value and changing the pH value to precipitate the crystallites.

If the aggregated dye is in the form of fine particles (or crystallites), the average grain size (diameter) is preferably in the range of 0.01 to 10 μm.

The dye used in an aggregated form is preferably a methine dye (e.g., cyanine, merocyanine, oxonol, styryl), more preferably a cyanine dye or an oxonol dye.

The cyanine dye is defined by the following formula.

$$Bo-Lo=Bs$$

In the formula, Bs is a basic nucleus, Bo is an onium body of basic nucleus, and Lo is a methine chain consisting of an odd number of methines.

The dye having the absorption maximum in the wavelength region of 560 to 620 nm preferably is a trimethine cyanine dye (particularly in an aggregated form), in which Lo consists of three methines.

A more preferred trimethine cyanine dye is represented by the following formula (I).

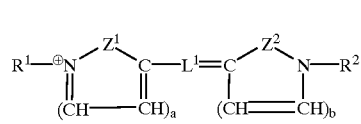

(I)

In the formula (I), each of $Z^1$ and $Z^2$ independently is a group of non-metallic atoms forming a five-membered or six-membered nitrogen-containing heterocyclic ring. The nitrogen-containing heterocyclic ring can be condensed with anther heterocyclic ring, an aromatic ring or an aliphatic ring. Examples of the nitrogen-containing heterocyclic rings include oxazole ring, isoxazole ring, benzoxazole ring, naphthoxazole ring, oxazolocarbazole ring, oxazolodibenzofuran ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene ring or naphthalene ring. Oxazolocarbazole ring and oxazolodibenzofuran ring are more preferred, and oxazolodibenzofuran ring is most preferred.

The nitrogen-containing heterocyclic ring and the condensed ring can have a substituent group. Examples of the substituent groups include a halogen atom, cyano, nitro, an aliphatic group, an aromatic group, a heterocyclic group, —O—$R^{11}$, —CO—$R^{12}$, —CO—O—$R^{13}$, —O—CO—$R^{14}$, —$NR^{15}R^{16}$, —NH—CO—$R^{17}$, —CO—$NR^{18}R^{19}$, —NH—CO—$NR^{20}R^{21}$, —NH—CO—O—$R^{22}$, —S—$R^{23}$, —$SO_2$—$R^{24}$, —$SO_2$—O—$R^{25}$, —NH—$SO_2$—$R^{26}$ and —$SO_2$—$NR^{27}R^{28}$. Here each of $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ independently is hydrogen, an aliphatic group, an aromatic group or a heterocyclic group. If $R^{13}$ in —CO—O—$R^{13}$ or $R^{25}$ in —$SO_2$—O—$R^{25}$ is a hydrogen atom (namely the group is carboxyl or sulfo, respectively), the hydrogen atom may be dissociated or the group may be in the form of a salt.

In the present specification, the term "an aliphatic group" means an alkyl group, a substituted alkyl group, an alkenyl group, a substituted alkenyl group, an alkynyl group, a substituted alkynyl group, an aralkyl group or a substituted aralkyl group.

The alkyl group may have a cyclic structure or a branched chain structure. The alkyl group preferably has 1 to 20 carbon atoms, more preferably has 1 to 12 carbon atoms, and most preferably has 1 to 8 carbon atoms. Examples of the alkyl groups include methyl, ethyl, propyl, isopropyl, butyl, t-butyl, cyclopropyl, cyclohexyl and 2-ethylhexyl.

The alkyl moiety of the substituted alkyl group is the same as the above-described alkyl group. Examples of the substituent groups of the substituted alkyl group are the same as the above-described substituent groups of the nitrogen-containing heterocyclic ring and the condensed ring, except cyano, nitro and an aliphatic group. Examples of the substituted alkyl groups include 2-hydroxyethyl, 2-carboxyethyl, 2-methoxyethyl, 2-diethylaminoethyl, 3-sulfopropyl and 4-sulfobutyl.

The alkenyl group may have a cyclic structure or a branched structure. The alkenyl group preferably has 2 to 20 carbon atoms, more preferably has 2 to 12 carbon atoms, and most preferably has 2 to 8 carbon atoms. Examples of the alkenyl groups include vinyl, allyl, 1-propenyl, 2-butenyl, 2-pentenyl and 2-hexenyl.

The alkenyl moiety of the substituted alkenyl group is the same as the above-described alkenyl group. Examples of the substituent groups of the substituted alkenyl groups are the same as the substituent groups of the substituted alkyl group.

The alkynyl group may have a cyclic structure or a branched structure. The alkynyl group preferably has 2 to 20 carbon atoms, more preferably has 2 to 12 carbon atoms, and most preferably has 2 to 8 carbon atoms. Examples of the alkynyl groups include ethynyl and 2-propynyl.

The alkynyl moiety of the substituted alkynyl group is the same as the above-described the alkynyl group. Examples of the substituent groups of the substituted alkynyl group are the same as the substituent groups of the substituted alkyl group.

The alkyl moiety of the aralkyl group is the same as the above-described alkyl group. The aryl moiety of the aralkyl group is the same as the below-described aryl group. Examples of the aralkyl groups include benzyl and phenethyl.

The alkyl moiety of the substituted aralkyl group is the same as the above-described alkyl group. The aryl moiety of the substituted aralkyl group is the same as the below-described aryl group. Examples of the substituent groups of the alkyl moiety are the same as the substituent groups of the substituted alkyl group. Examples of the substituent groups of the aryl moiety are the same as the substituent groups of the nitrogen-containing heterocyclic ring and the condensed ring.

In the present specification, the term "an aromatic group" means an aryl group or a substituted aryl group.

The aryl group preferably has 6 to 25 carbon atoms, more preferably has 6 to 15 carbon atoms, and most preferably has 6 to 10 carbon atoms. Examples of the aryl groups include phenyl and naphthyl.

The aryl moiety of the substituted aryl group is the same as the above-described aryl group. Examples of the substituent groups of the substituted aryl group are the same as the substituent groups of the nitrogen-containing heterocyclic ring and the condensed ring.

The heterocyclic group can have a substituent group. The heterocyclic group preferably has a 5-membered or 6-membered heterocyclic ring. The heterocyclic ring can be condensed with an aliphatic ring, an aromatic ring or another heterocyclic ring. Examples of the heterocyclic rings (and the condensed heterocyclic rings) include pyridine ring, piperidine ring, furan ring, furfuran ring, thiophene ring, pyrrole ring, quinoline ring, morpholine ring, indole ring, imidazole ring, pyrazole ring, carbazole ring, phenothiazine ring, phenoxazine ring, indoline ring, thiazole ring, pyrazine ring, thiadiazine ring, benzoquinoline ring and thiadiazole ring.

Examples of the substituent groups of the heterocyclic ring are the same as the substituent groups of the nitrogen-containing heterocyclic ring and the condensed ring.

In the formula (I), each of $R^1$ and $R^2$ independently is an aliphatic group or an aromatic group.

In the formula (I), $L^1$ is a methine chain consisting of three methines. The methine chain can have a substituent group. The substituent group is preferably placed at the center methine (i.e., meso-position) of the chain. Examples of the substituent groups are the same as the substituent groups of the nitrogen-containing heterocyclic ring and the condensed ring. Two subsistent groups of the methine chain can be combined with each other to form a five-membered or six-membered ring.

In the formula (I), each of a and b independently is 0 or 1. Each of a and b preferably is 0.

The trimethine cyanine dye represented by the formula (I) preferably has carboxyl or sulfo as the substituent.

The trimethine cyanine dye of the formula (I) can further have an anion or a cation as a charge balance ion.

Examples of the cation include hydrogen ion, metal ions and ammonium ions. The metal ion preferably is an alkali metal ion (sodium ion, potassium ion, lithium ion). The ammonium ions include organic ammonium ions (e.g., tetramethyl ammonium ion, triethylammonium ion).

Examples of the anions include halogen ions (chloride ion, bromide ion, iodide ion), p-toluenesulfone ion, ethylsulfate ion, $PF_6^-$, $BF_4^-$ and $ClO_4^-$.

The most preferred trimethine cyanine dye is represented by the following formula (Ia).

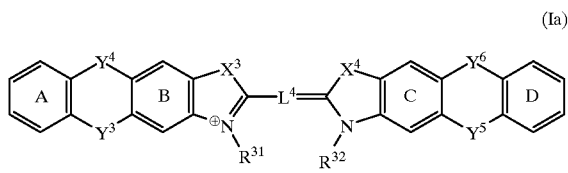

(Ia)

In the formula (Ia), each of $R^{31}$ and $R^{32}$ independently is an aliphatic group.

In the formula (Ia), each of $X^3$ and $X^4$ independently is —O—, —S—, —Se—, —NR$^{33}$— or —CR$^{34}$R$^{35}$—. Each of $X^3$ and $X^4$ preferably is —O—.

Each of $R^{33}$, $R^{34}$ and $R^{35}$ independently is hydrogen, an aliphatic group or an aromatic group.

In the formula (Ia), one of $Y^3$ and $Y^4$ is a single bond, —O— or —NR$^{36}$—. One of $Y^3$ and $Y^4$ preferably is a single bond. The other of $Y^3$ and $Y^4$ is —O— or —NR$^{36}$—. One of $Y^5$ and $Y^6$ is a single bond, —O— or —NR$^{36}$—. One of $Y^5$ and $Y^6$ preferably is a single bond. The other of $Y^5$ and $Y^6$ is —O— or —NR$^{36}$—. $R^{36}$ is hydrogen, an aliphatic group or an aromatic group.

In the formula (Ia), $L^4$ is a methine chain consisting of three methines. The methine chain can have a substituent group. The substituent group is preferably placed at the center methine (i.e., meso-position) of the chain. Examples of the substituent groups are the same as the substituent groups of the nitrogen-containing heterocyclic ring and the condensed ring. Two subsistent groups of the methine chain can be combined with each other to form a five-membered or six-membered ring.

In the formula (Ia), benzene rings A, B, C and D can have a substituent group. Examples of the substituent groups are the same as the substituent groups of the nitrogen-containing heterocyclic ring and the condensed ring.

The trimethine cyanine dye represented by the formula (Ia) preferably has carboxyl or sulfo as the substituent group.

The trimethine cyanine dye of the formula (Ia) can further have an anion or a cation as a charge balance ion.

Examples of the cations include hydrogen ion, metal ions and ammonium ions. The metal ion preferably is an alkali metal ion (sodium ion, potassium ion, lithium ion). The ammonium ions include organic ammonium ions (e.g., tetramethyl ammonium ion, triethylammonium ion).

Examples of the anions include halogen ions (chloride ion, bromide ion, iodide ion), p-toluenesulfone ion, ethylsulfate ion, $PF_6^-$, $BF_4^-$ and $ClO_4^-$.

Examples of the trimethine cyanine dye represented by the formula (I) are shown below.

(I-1)

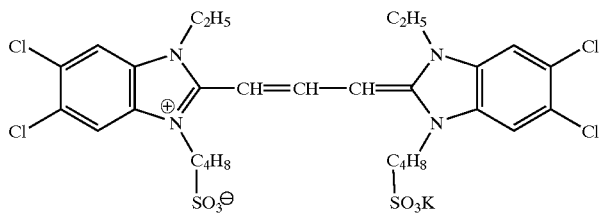

(I-2)

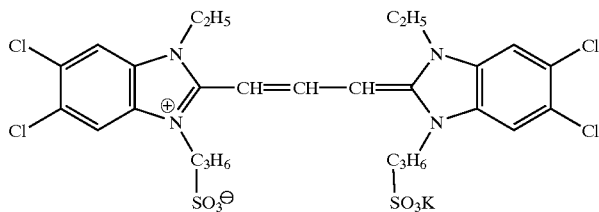

(I-3)

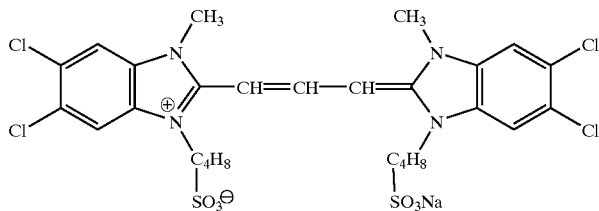

(I-4)
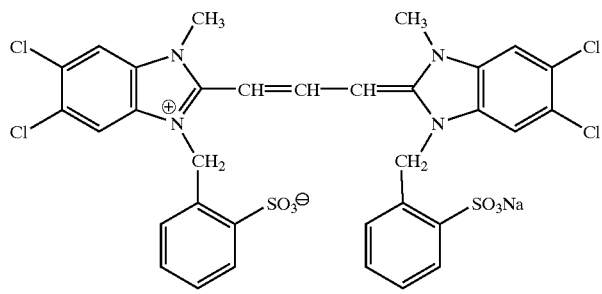
(I-5)
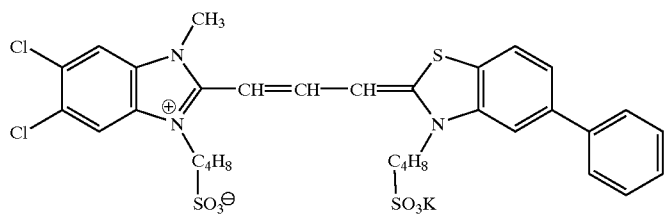
(I-6)
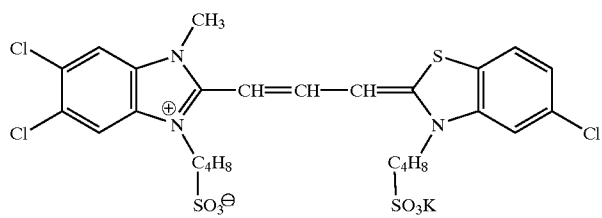
(I-7)
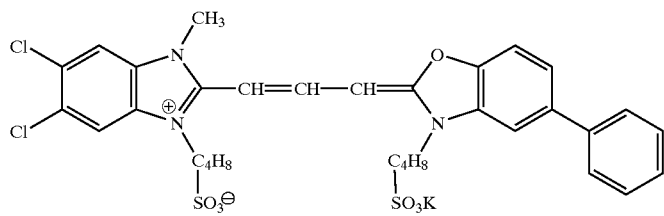
(I-8)
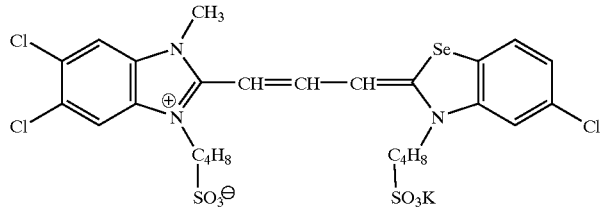
(I-9)
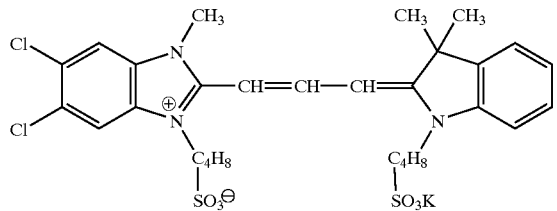

(I-10)
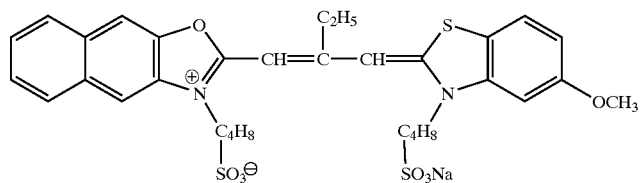
(I-11)
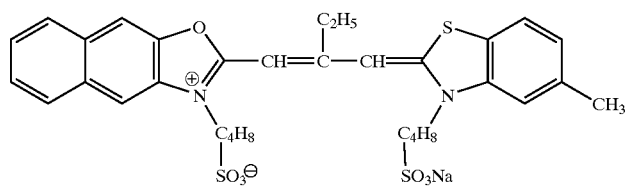
(I-12)
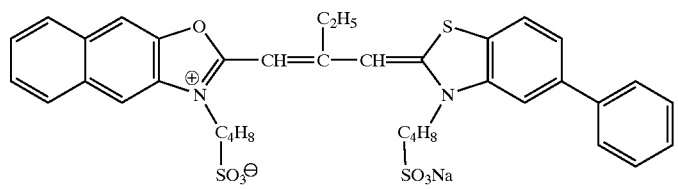
(I-13)
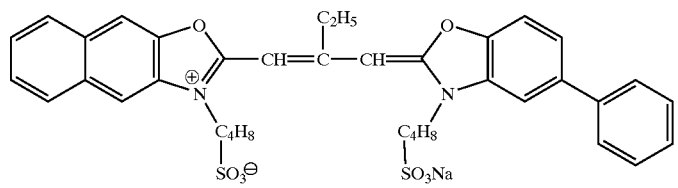
(I-14)
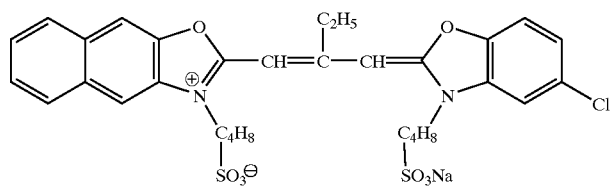
(I-15)
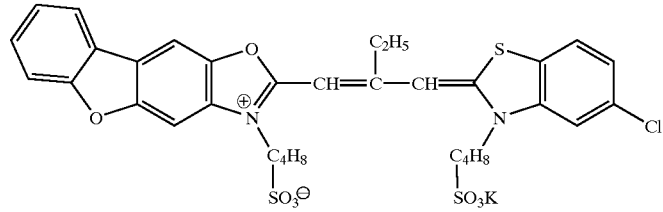
(I-16)
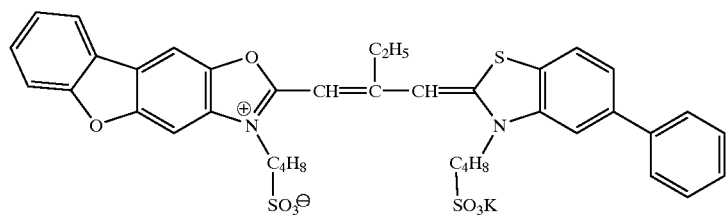

-continued
(I-17)
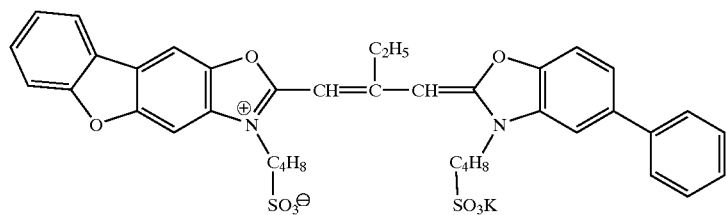
(I-18)
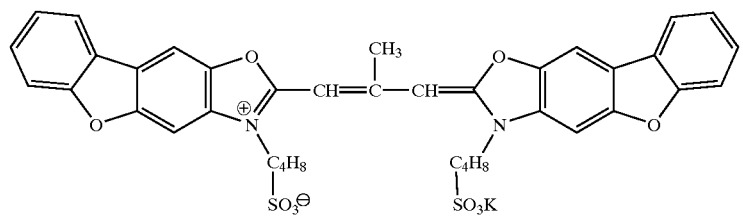
(I-19)
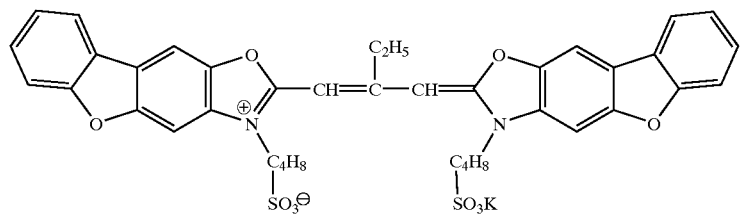
(I-20)
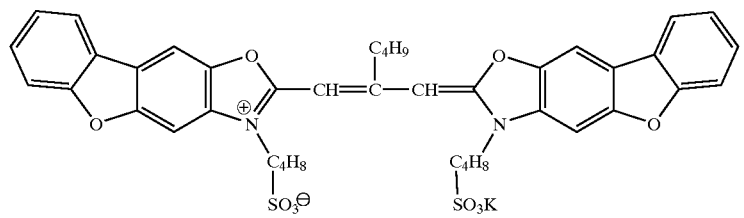
(I-21)
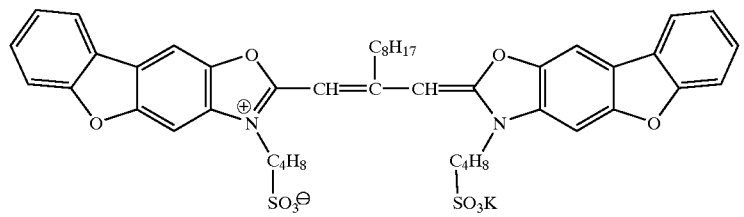
(I-22)
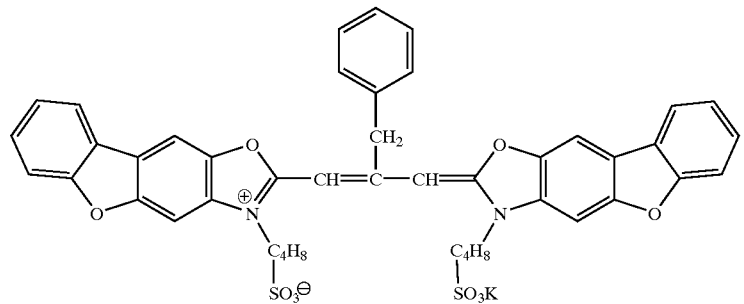

-continued
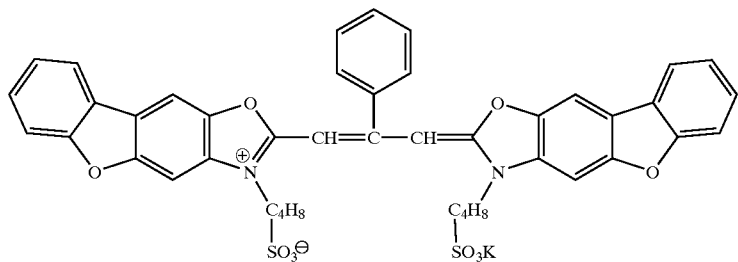
(I-23)
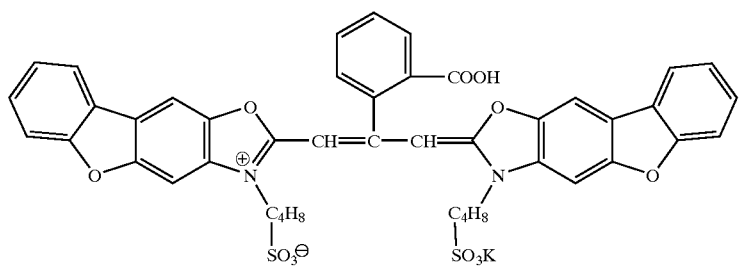
(I-24)
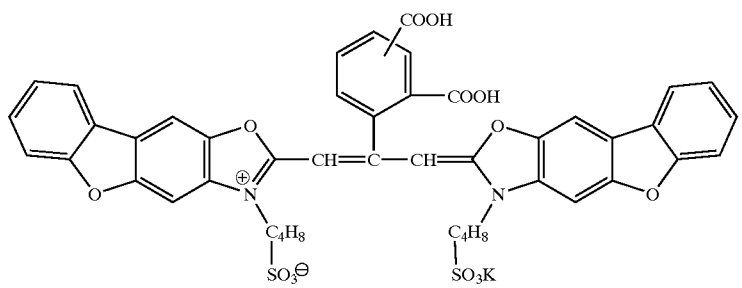
(I-25)
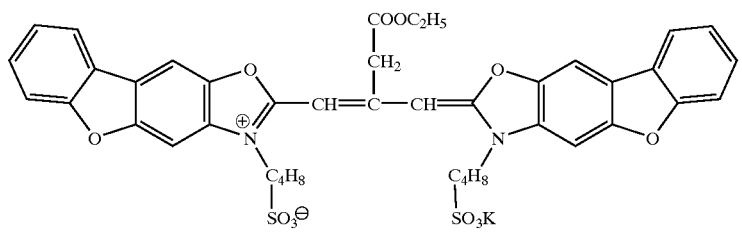
(I-26)
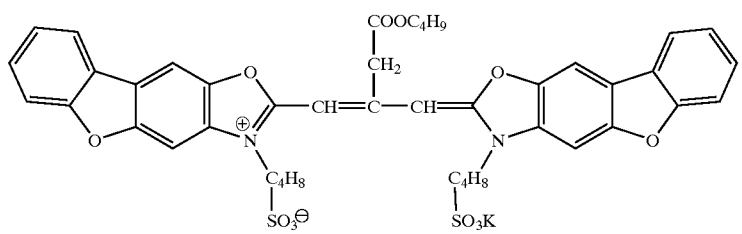
(I-27)

-continued
(I-28)
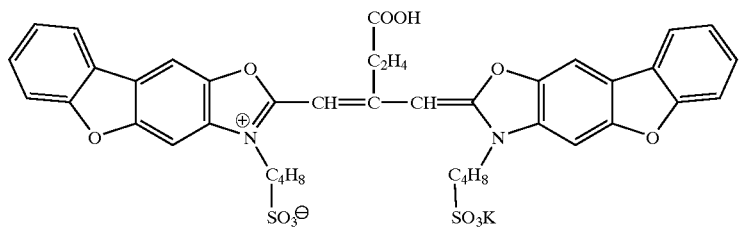
(I-29)
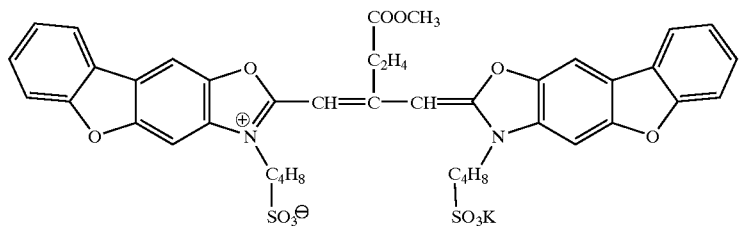
(I-30)
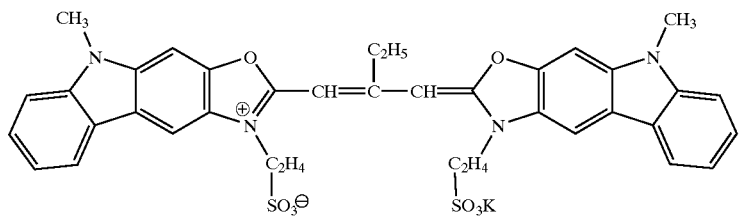
(I-31)
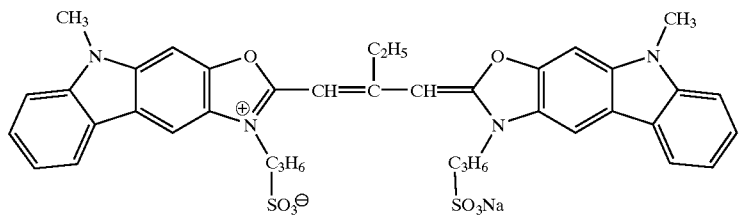
(I-32)
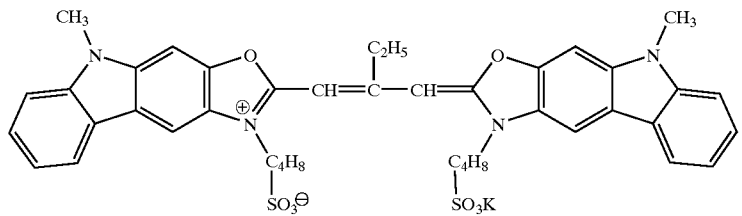
(I-33)
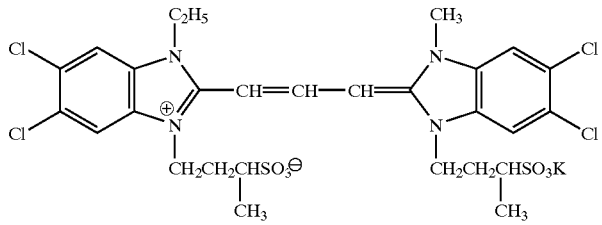

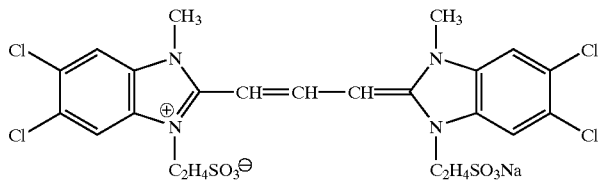

(I-34)

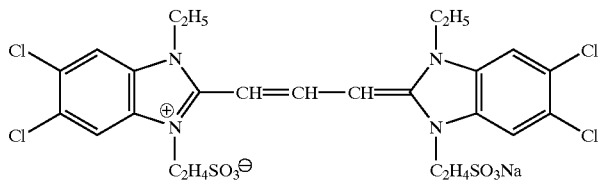

(I-35)

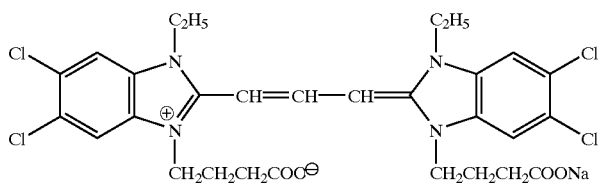

(I-36)

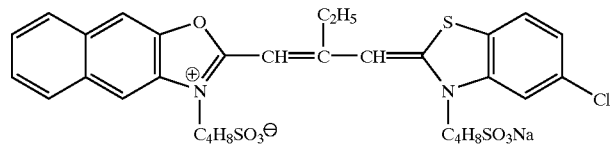

(I-37)

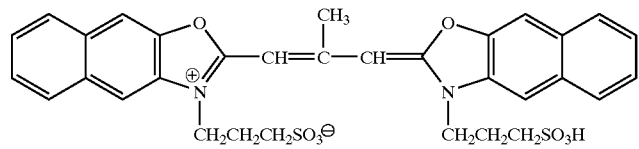

(I-38)

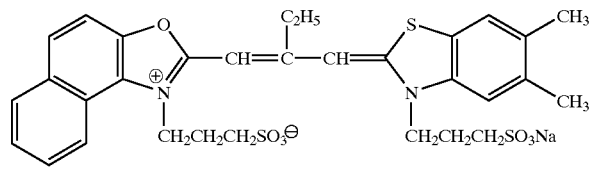

(I-39)

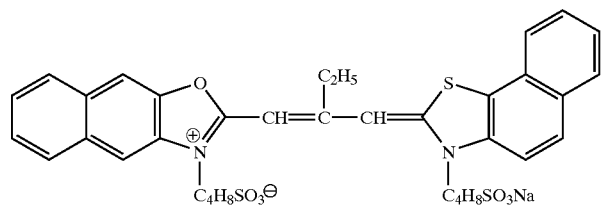

(I-40)

Examples of the anions include halogen ions (chloride ion, bromide ion, iodide ion), p-toluenesulfone ion, ethylsulfate ion, $PF_6^-$, $BF_4^-$ and $ClO_4^-$.

Examples of the heptamethine cyanine dye represented by the formula (II) are shown below.

Examples of other methine (trimethine oxonol) dyes having the absorption maximum in the wavelength region of 560 to 620 nm are shown below.

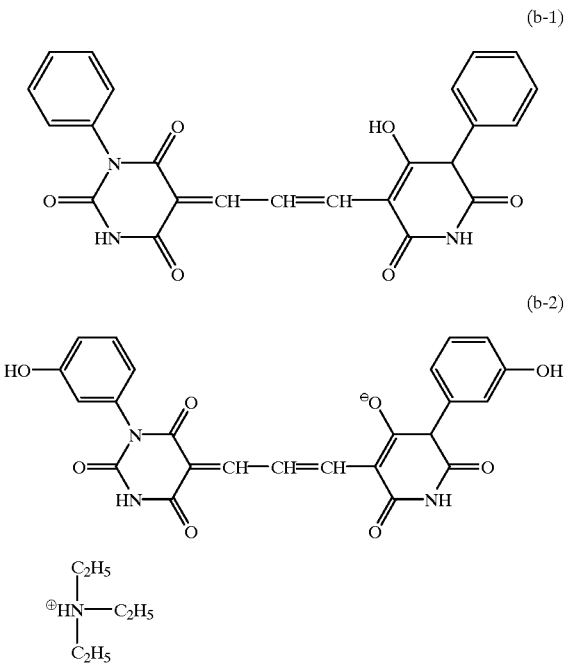

Further, the optical filter can contain a dye having two absorption maximums in the wavelength range of 500 to 550 nm as well as in the wavelength range of 560 to 620 nm. A dye in an aggregated form (such as in the form of a particle dispersion) usually has an absorption maximum in a long wavelength region compared with the same dye in an non-aggregated form. In other words, the absorption maximum of a dye can be shifted to a long wavelength region by changing the non-aggregated form to the aggregated form. Further, the peak at the absorption maximum of an aggregated form is sharper than that of a non-aggregated form. Therefore, a dye (in a non-aggregated form) having an absorption maximum in the wavelength range of 500 to 550 nm sometimes further has an absorption maximum in the wavelength range of 560 to 620 nm (in an aggregated form). The two absorption maximums in the wavelength range of 500 to 550 nm (a non-aggregated form) as well as in the wavelength range of 560 to 620 nm (an aggregated form) can be obtained by using the above-described dye in a partially aggregated form. Examples of the dyes having absorption maximums in the wavelength range of 500 to 550 nm as well as in the wavelength range of 560 to 620 nm are shown below.

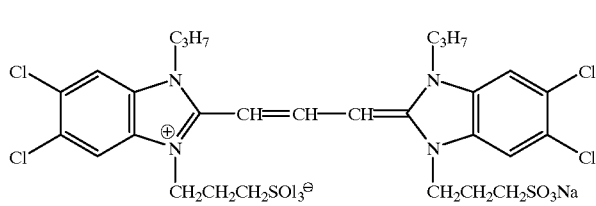

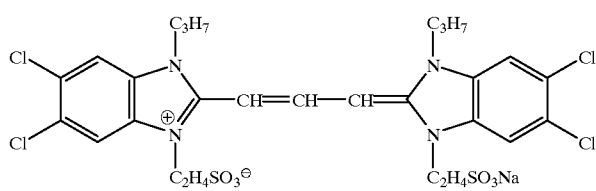

(ab-3)

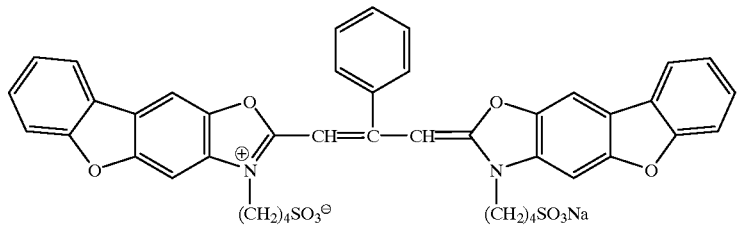

(ab-4)

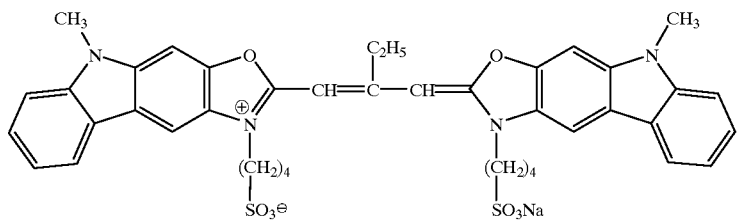

(ab-5)

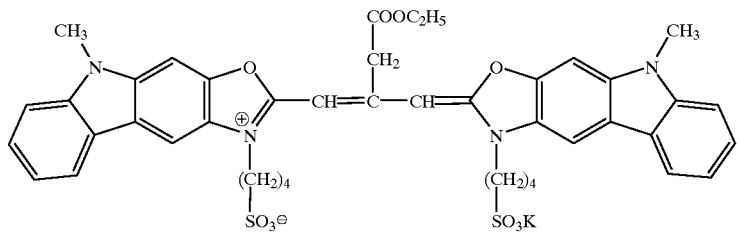

The dye having an absorption maximum in the wavelength region of 700 to 1,200 nm preferably is a cyanine dye having five, seven or nine methines, namely a pentamethine cyanine dye, a heptamethine cyanine dye or a nonamethine cyanine dye (particularly in an aggregated form).

A preferred pentamethine, heptamethine or nonamethine cyanine dye is represented by the following formula (II).

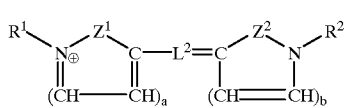

(II)

In the formula (II), each of $Z^1$ and $Z^2$ independently is a group of non-metallic atoms forming a five-membered or six-membered nitrogen-containing heterocyclic ring. The nitrogen-containing heterocyclic ring may be condensed with another heterocyclic ring, an aromatic ring or an aliphatic ring. Examples of the nitrogen-containing heterocyclic rings include oxazole ring, isoxazole ring, benzoxazole ring, naphthoxazole ring, oxazolocarbazole ring, oxazolodibenzofuran ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene or naphthalene ring. Indolenine ring and benzoindolenine ring are most preferred.

The nitrogen-containing heterocyclic ring and the condensed ring can have a substituent group. Examples of the substituent groups include a halogen atom, cyano, nitro, an aliphatic group, an aromatic group, a heterocyclic group, —O—$R^{11}$, —CO—$R^{12}$, —CO—O—$R^{13}$, —O—CO—$R^{14}$, —$NR^{15}R^{16}$, —NH—CO—$R^{17}$, —CO—$NR^{18}R^{19}$, —NH—CO—$NR^{20}R^{21}$, —NH—CO—O—$R^{22}$, —S—$R^{23}$, —$SO_2$—$R^{24}$, —$SO_2$—O—$R^{25}$, —NH—$SO_2$—$R^{26}$ and —$SO_2$—$NR^{27}R^{28}$. Each of $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ independently is hydrogen, an aliphatic group, an aromatic group or a heterocyclic group. If $R^{13}$ in —CO—O—$R^{13}$ or $R^{25}$ in —$SO_2$—O—$R^{25}$ is a hydrogen atom (namely the group is carboxyl or sulfo, respectively), the hydrogen atom may be dissociated or the group may be in the form of a salt.

In the formula (II), each of $R^1$ and $R^2$ independently is an aliphatic group or an aromatic group.

In the formula (II), $L^2$ is a methine chain consisting of five, seven or nine methines. The methine chain preferably consists of seven methines. Accordingly, a heptamethine cyanine dye is particularly preferred. The methine chain can have a substituent group. The substituent group is preferably placed at the center methine (i.e., meso-position) of the chain. Examples of the substituent groups are the same as the substituent groups of the nitrogen-containing heterocyclic ring and the condensed ring described about the formula (I). Two substituent groups of the methine chain can be combined with each other to form a five-membered or six-membered ring.

In the formula (II), each of a and b independently is 0 or 1. Each of a and b preferably is 0.

The pentamethine cyanine, heptamethine cyanine or non-amethine cyanine dye represented by the formula (II) preferably has carboxyl or sulfo as the substituent.

The pentamethine cyanine, heptamethine cyanine or non-amethine cyanine dye of the formula (II) can further have an anion or a cation as a charge balance ion.

Examples of the cations include hydrogen ion, metal ions and ammonium ions. The metal ions preferably is an alkali metal ion (sodium ion, potassium ion, lithium ion). The ammonium ions include organic ammonium ions (e.g., tetramethyl ammonium ion, triethylammonium ion).

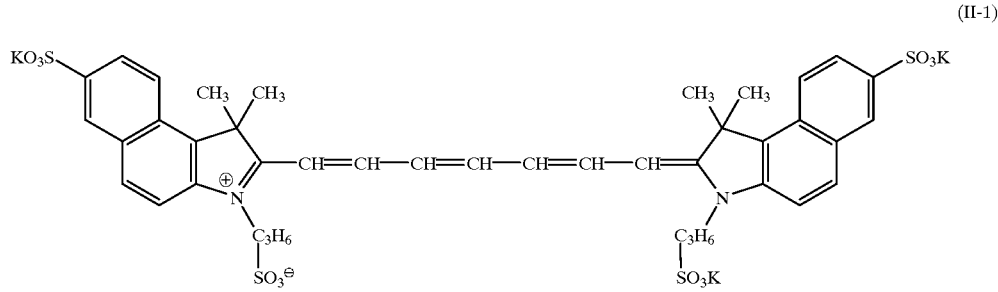
(II-1)

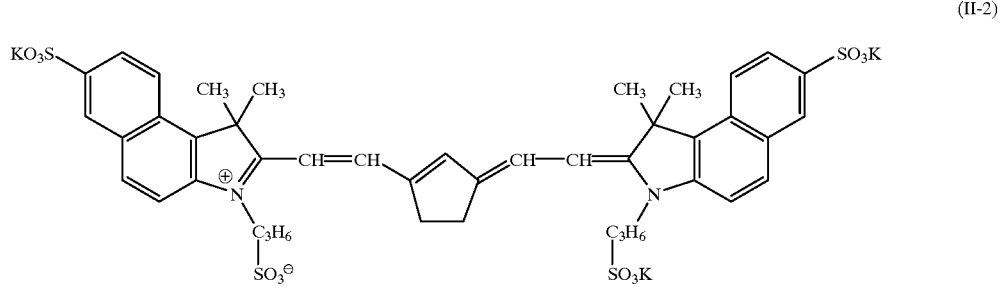
(II-2)

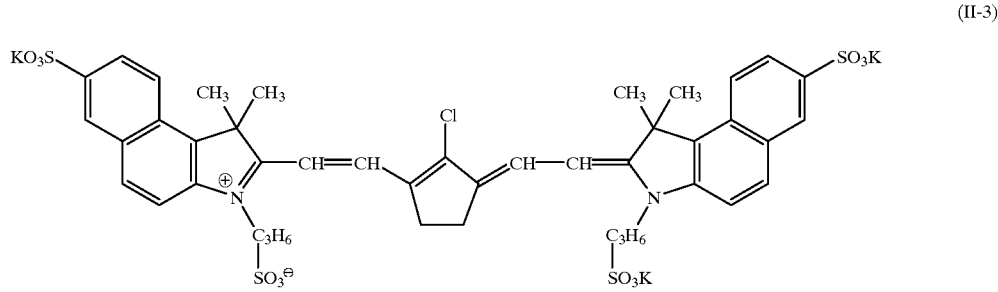
(II-3)

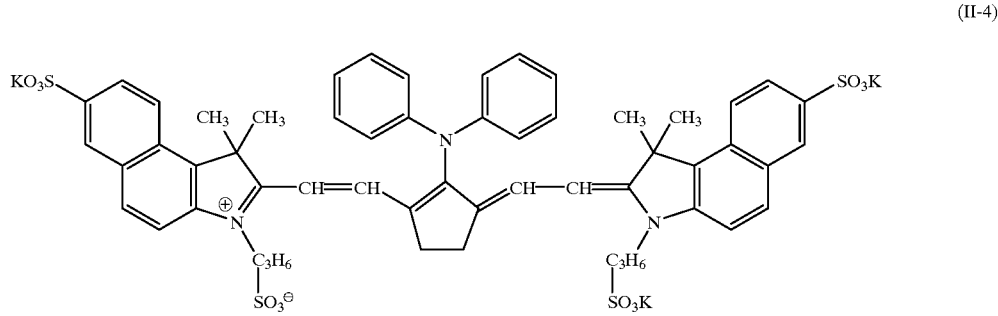
(II-4)

-continued
(II-5)
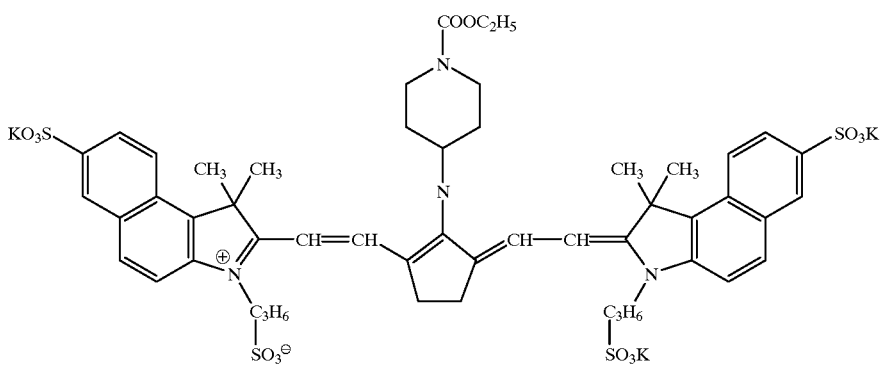
(II-6)
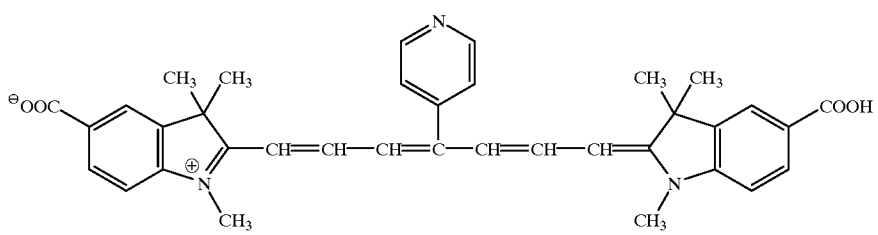
(II-7)
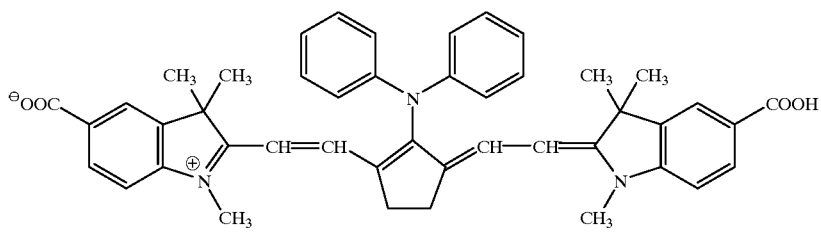
(II-8)
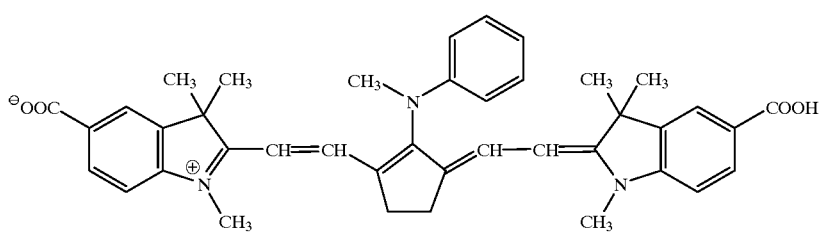
(II-9)
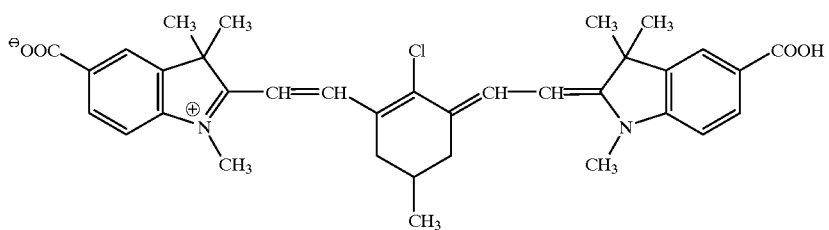

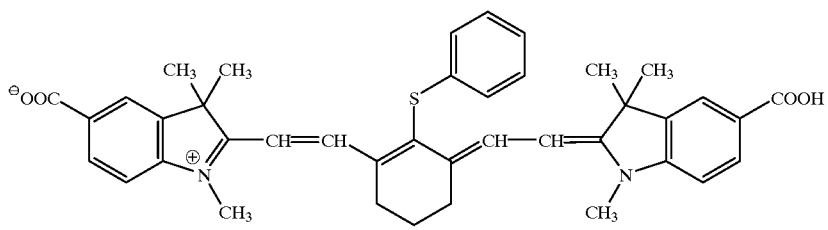
(II-10)
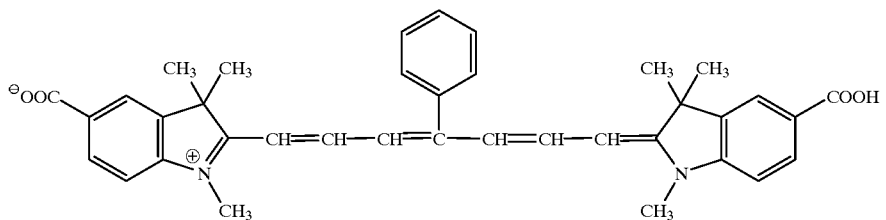
(II-11)
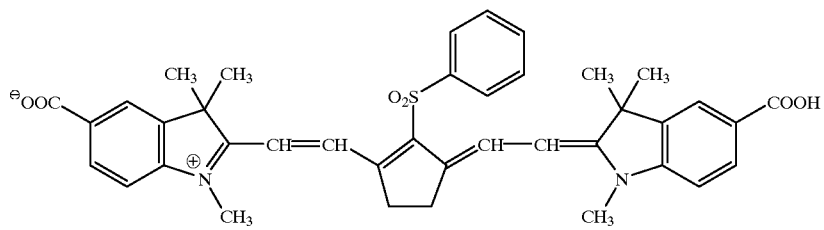
(II-12)
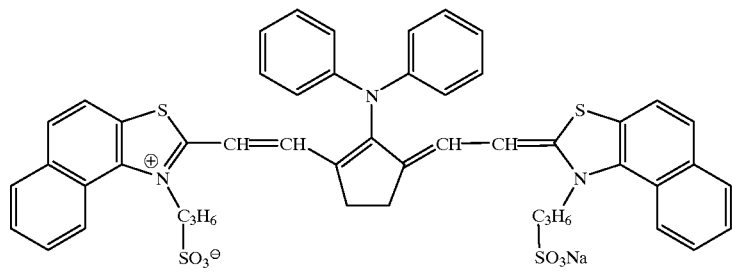
(II-13)
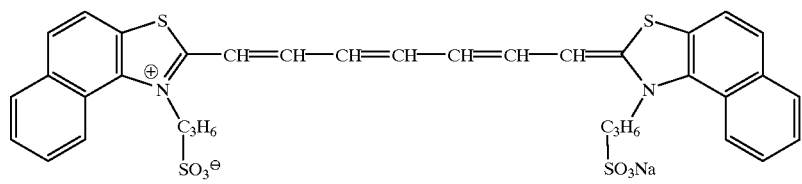
(II-14)

(II-15)

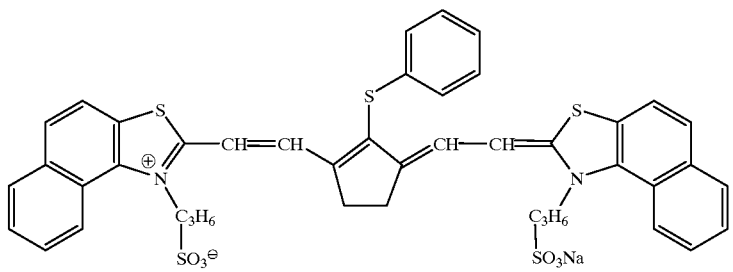

An oxonol dye can also be used as the dye having an absorption maximum in the wavelength region of 700 to 1,200 nm. The oxonol dye is defined by the following formula.

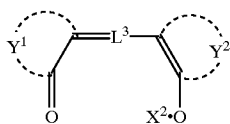

In the formula, Ak is an acidic nucleus in a keto form, Ae is an acidic nucleus in an enol form, and Lo is a methine chain consisting of an odd number of methines.

The oxonol dye (particularly in an aggregated form) is preferably represented by the following formula (III):

(III)

$$Y^1 \overset{L^3}{=} Y^2$$
$$O \quad X^2 \cdot O$$

In the formula (III), each of $Y^1$ and $Y^2$ independently is a group of non-metallic atoms forming an aliphatic or heterocyclic (preferably, heterocyclic) ring. Examples of the aliphatic ring include indadione ring. Examples of the heterocyclic ring include 5-pyrazolone ring, oxazolone ring, barbituric acid ring, pyridone ring, rhodanine ring, pyrazolidinedione ring, pyrazolopyridone ring and merdramic acid ring. Barbituric acid ring is preferred.

The aliphatic or heterocyclic ring can have a substituent group. Examples of the substituent groups include a halogen atom, cyano, nitro, an aliphatic group, an aromatic group, a heterocyclic group, —O—$R^{11}$, —CO—$R^{12}$, —CO—O—$R^{13}$, —O—CO—$R^{14}$, —$NR^{15}R^{16}$, —NH—CO—$R^{17}$, —CO—$NR^{18}R^{19}$, —NH—CO—$NR^{20}R^{21}$, —NH—CO—O—$R^{22}$, —S—$R^{23}$, —$SO_2$—$R^{24}$, —$SO_2$—O—$R^{25}$, —NH—$SO_2$—$R^{26}$ and —$SO_2$—$NR^{27}R^{28}$. Here each of $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is independently a hydrogen atom, an aliphatic group, an aromatic group or a heterocyclic group. If $R^{13}$ in —CO—O—$R^{13}$ or $R^{25}$ in —$SO_2$—O—$R^{25}$ is hydrogen (namely the group is carboxyl or sulfo, respectively), hydrogen can be dissociated or the group can be in the form of a salt.

In the formula (III), $L^3$ is a methine chain consisting of an odd number of methines. The number of methines is preferably 3, 5 or 7. The methine chain can have a substituent group. The substituent group is preferably placed at the center methine (i.e., meso-position) of the chain. Examples of the substituent groups are the same as the substituent groups of the nitrogen-containing heterocyclic ring and the condensed ring described about the formula (I). Two substituent groups of the methine chain can be combined with each other to form a five-membered or six-membered ring.

In the formula (III), $X^2$ is hydrogen or a cation. The oxonol dye of the formula (III) can further have an anion or a cation as a charge balance ion.

Examples of the cation include hydrogen ion, metal ions and ammonium ions. The metal ion preferably is an alkali metal ion (sodium ion, potassium ion, lithium ion). The ammonium ions include organic ammonium ions (e.g., tetramethyl ammonium ion, triethylammonium ion).

Examples of the anion include halogen ions (chloride ion, bromide ion, iodide ion), p-toluenesulfone ion, ethylsulfate ion, $PF_6^-$, $BF_4^-$ and $ClO_4^-$.

Examples of the oxonol dye represented by the formula (III) are shown below.

(III-1)

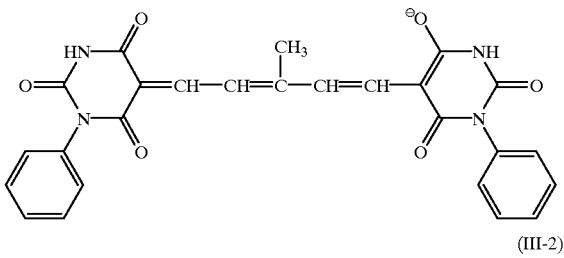

(III-2)

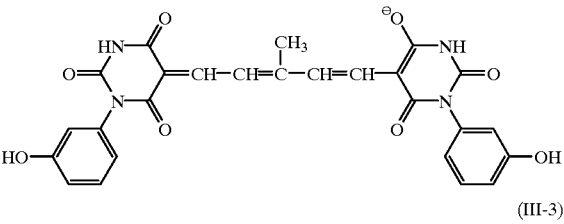

(III-3)

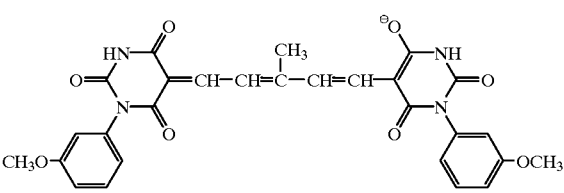

Examples of other (squarylium) dyes having the absorption maximum in the wavelength region of 700 to 1,200 nm are shown below.

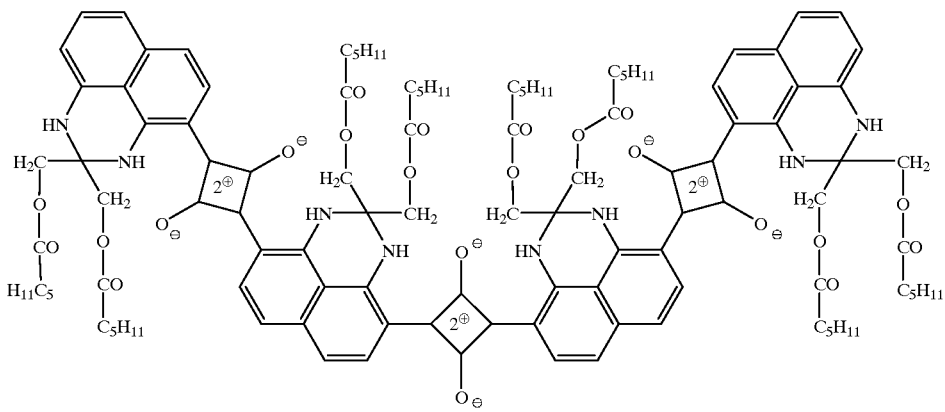

(c-1)

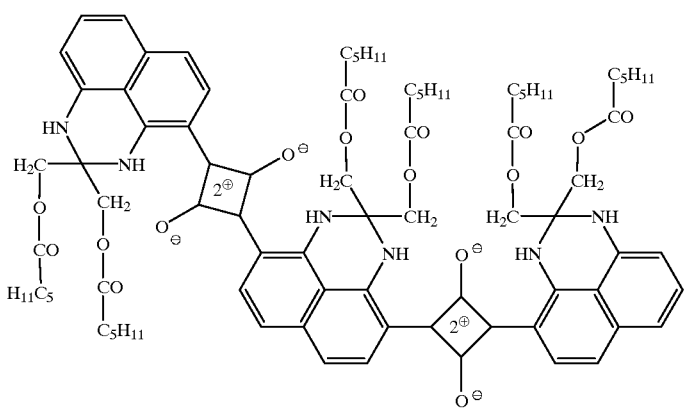

(c-2)

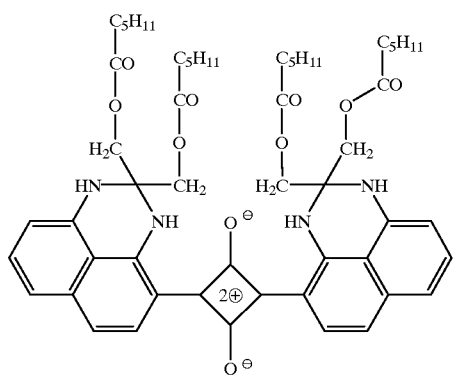

(c-3)

The cyanine dye represented by the formula (I) or (II) can be prepared by referring to the descriptions of "Heterocyclic Compounds Cyanine Dyes and Related Compounds" by F. M. Harmer (John Wiley & Sons, 1964); "Heterocyclic Compounds Special Topics in Heterocyclic Chemistry" chapter 18, section 14, pp. 482–515, by D. M. Sturmer (John Wiley & Sons, 1977); "Rodds Chemistry of Carbon Compounds" 2nd. Ed. vol. IV, part B, chapter 15, pp. 369–422 (Elsevier Science Publishing Company Inc., 1977); and Japanese Patent Provisional Publication Nos. 5(1993)-88293 and 6(1994)-313939.

The oxonol dye represented by the formula (III) can be prepared by referring to the descriptions of Japanese Patent Provisional Publication No. 7(1995)-230671, European Patent No. 0,778,493 and U.S. Pat. No. 5,459,265.

The optical filter (preferably the filter layer) can have another absorption maximum in the wavelength region of 500 to 550 nm, as well as the absorption maximums in the wavelength regions of 560 to 620 nm and 700 to 1,200 nm. The transmittance at the absorption maximum in the wavelength region of 500 to 550 nm is preferably within the range of 20 to 85%.

The absorption maximum in the wavelength region of 500 to 550 nm can adjust intensity of emitted green luminescence (which is sensitively detected by the eyes). The green luminescence is preferably gradually cut off in the spectrum. Accordingly, the half width (the width of the wavelength region giving half of the maximum absorbance) of the absorption peak in the wavelength region of 500 to 550 nm is preferably within the range of 30 to 300 nm, more preferably within the range of 40 to 300 nm, further preferably within the range of 50 to 150 nm, and most preferably within the range of 60 to 150 nm.

Squarylium dyes, azomethine dyes, cyanine dyes, oxonol dyes, anthraquinone dyes, azo dyes, benzylidene dyes and metal chelate compounds thereof are preferably used as a dye having an absorption maximum in the wavelength region of 500 to 550 nm.

Examples of the dyes having the absorption maximum in the wavelength region of 500 to 550 nm are shown below.

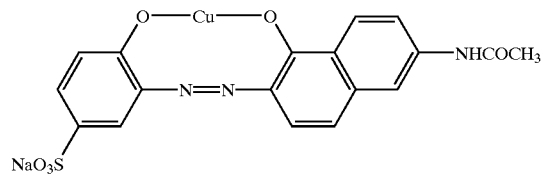
(a-1)

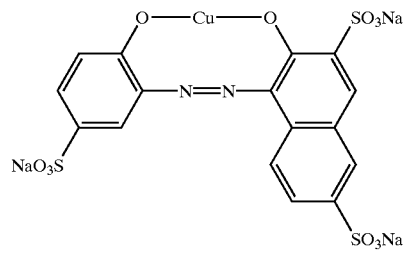
(a-2)

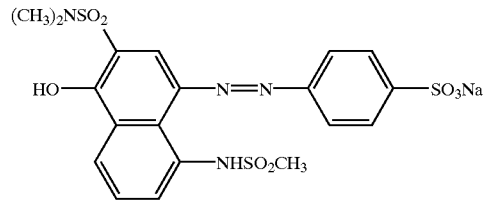
(a-3)

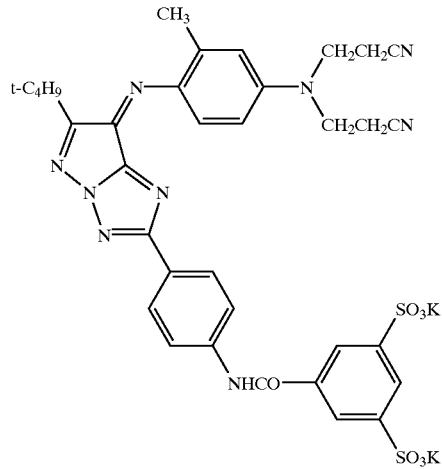
(a-4)

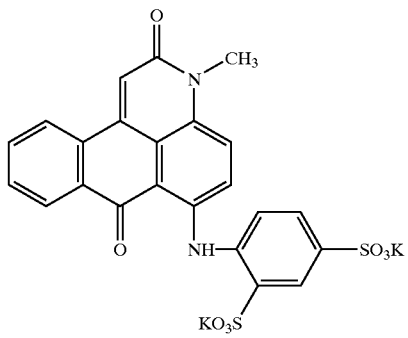
(a-5)
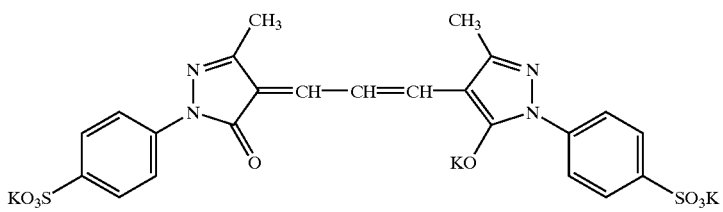
(a-6)
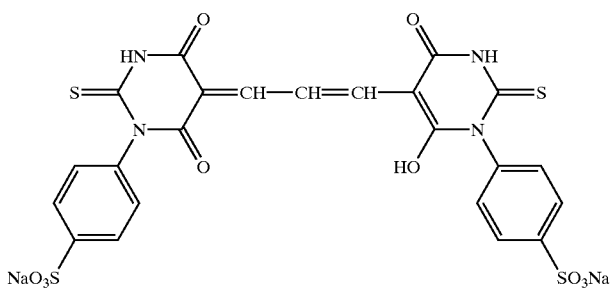
(a-7)
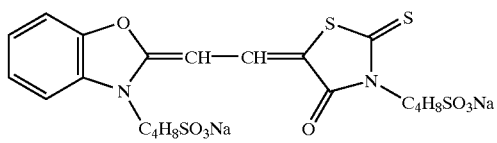
(a-8)
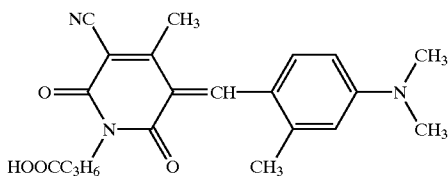
(a-9)
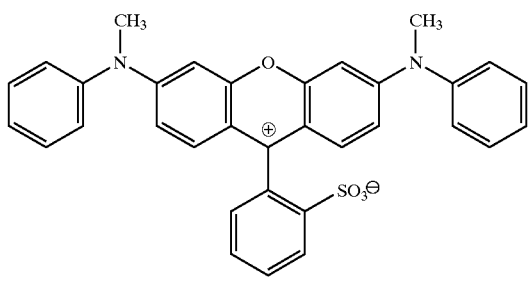
(a-10)

(a-11)

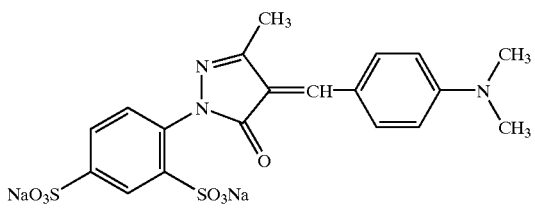

Further, a dye having an absorption maximum in the wavelength region of 350 to 450 nm or 470 to 530 nm is also preferably used for adjusting color tone of the filter layer. Examples of that dye include squarylium dyes, azomethine dyes, cyanine dyes, merocyanine dyes, oxonol dyes, anthraquinone dyes, azo dyes, benzylidene dyes and metal chelate compounds thereof.

As is described above, the filter layer can contain two or more dyes.

The filter layer has a thickness of preferably 0.1 $\mu$m to 1 cm, more preferably 0.5 $\mu$m to 100 $\mu$m.

The filter layer can further contain an ultraviolet absorbing agent or an anti-fading agent. The anti-fading agent stabilizes the dyes, and examples of the anti-fading agent include hydroquinone derivatives (described in U.S. Pat. Nos. 3,935,016 and 3,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455, 2,062,888 and Japanese Patent Provisional Publication No. 61(1986)-90155), chroman, spirochroman or coumaran derivatives (described in U.S. Pat. Nos. 3,432,300, 3,573,050, 3,574,627, 3,764,337 and Japanese Patent Provisional Publication Nos. 52(1977)-152225, 53(1978)-20327, 53(1978)-17729, and 61(1986)-90156), hydroquinone monoether or p-aminophenol derivatives (described in British Patent Publication Nos. 1,347,556, 2,066,975, Japanese Patent Publication No. 54(1979)-12337, and Japanese Patent Provisional Publication No. 55(1980)-6321), and bisphenol derivatives (described in U.S. Pat. No. 3,700,455, and Japanese Patent Publication No. 48(1973)-31625).

Metal complexes (described in U.S. Pat. No. 4,245,018, and Japanese Patent Provisional Publication No. 60(1985)-97353) can be also used as the anti-fading agent for improving the stability of the dyes against light and heat.

Further, a singlet oxygen quencher can be used as the anti-fading agent for improving the light resistance of the dyes. Examples of the singlet oxygen quencher include nitroso compounds (described in Japanese Patent Provisional Publication No. 2(1990)-300288), diimmonium compounds (described in U.S. Pat. No. 0,465,612), nickel complexes (described in Japanese Patent Provisional Publication No. 4(1992)-146189) and oxidation inhibitors (described in European Patent Publication No. 820057A1).

Examples of the binder polymer contained in the filter layer include natural polymers (e.g., gelatin, cellulose derivatives, alginic acid), and synthesized polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyimide). Preferred polymers are hydrophilic ones (e.g., the aforementioned natural polymers, polyvinyl butyral, polyvinyl pyrrolidone, polyvinyl alcohol, water-soluble polyimide), and gelatin is particularly preferred.

[Transparent Support]

The support is preferably made of a polymer film. Examples of the materials for the polymer film include cellulose esters (e.g., diacetyl cellulose, triacetyl cellulose (TAC), propionyl cellulose, butyryl cellulose, acetyl propionyl cellulose, nitrocellulose), polyamides, polycarbonates, polyesters (e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate, polybutylene terephthalate), polystyrenes (e.g., syndiotactic polystyrene), polyolefins (e.g., polypropylene, polyethylene, polymethylpentene), polymethyl methacrylate, syndiotactic polystyrene, polysulfone, polyethersulfone, polyetherketone, polyether imide and polyoxyethylene. Triacetyl cellulose (TAC), polycarbonates and polyethylene terephthalate are preferred.

The transparent support has a thickness of preferably 5 $\mu$m to 5 cm, more preferably 25 $\mu$m to 1 cm, most preferably 80 $\mu$m to 1.2 mm.

The transparent support has a transmittance of preferably more than 80%, more preferably more than 86%. The haze of the support is in the range of preferably less than 2.0%, more preferably less than 1.0%. The support preferably has a refractive index of 1.45 to 1.70.

The support can contain an ultraviolet absorbing agent. The amount of the ultraviolet absorbing agent is preferably in the range of 0.01 to 20 wt. %, more preferably 0.05 to 10 wt. %.

The support can also contain an infrared absorbing agent having the absorption maximum in the wavelength region of 700 to 1,200 nm in place of adding a dye into the filter layer. Examples of the infrared absorbing agents include a copper resin composition (described in Japanese Patent Provisional Publication No. 6(1994)-118228), a resin composition containing a copper compound and a phosphorous compound (described in Japanese Patent Provisional Publication No. 62(1987)-5190), a resin composition containing a copper compound and a thiourea derivative (described in Japanese Patent provisional Publication No. 6(1994)-73197) and a resin composition containing a tungsten compound (described in U.S. Pat. No. 3,647,729).

The support may further contain particles of an inert inorganic compound as a slipping agent. Examples of the inorganic compound include $SiO_2$, $TiO_2$, $BaSO_4$, $CaCO_3$, talc and kaolin.

The support may be subjected to surface treatment. Examples of the surface treatment include chemical treatment, mechanical treatment, corona discharge treatment, flame treatment, UV treatment, high-frequency treatment, glow discharge treatment, active plasma treatment, laser treatment, mixed acid treatment and ozone-oxidation treatment. Preferred treatments are glow discharge treatment, UV treatment, corona discharge treatment and flame treatment. Glow discharge treatment is particularly preferred. For enhancing the adhesion between the support and the layer provided thereon, an undercoating layer may be provided on the support.

In the case that the optical filter is attached to a front plate of a display, the front plate preferably has an inorganic glass plate as the transparent support. The thickness of the glass plate is preferably in the range of 1 to 5 mm, more preferably in the range of 1.5 to 4.5 mm, and most preferably in the range of 2 to 4 mm. A tempered glass plate is preferably used to protect the front plate and to promote the safety.

[Undercoating Layer]

An undercoating layer is preferably provided between the transparent support and the filter layer. The undercoating layer is preferably prepared from a soft polymer. The term "a soft polymer" means a polymer having a modulus of elasticity at room temperature in the range of 1.000 to 1 MPa, preferably 800 to 5 MPa, and more preferably 500 to 10 MPa.

The undercoating layer has a thickness of preferably 2 nm to 20 $\mu$m, more preferably 5 nm to 5 $\mu$m, most preferably 50 nm to 5 $\mu$m.

The polymer in the undercoating layer preferably has a glass transition temperature of −60° C. to 60° C. The polymer having a glass transition temperature of −60° C. to 60° C. can be prepared by polymerization or copolymerization of vinyl chloride, vinylidene chloride, vinyl acetate, butadiene, neoprene, styrene, chloroprene, acrylic ester, methacrylic ester, acrylonitrile or methyl vinyl ether.

The glass transition temperature is preferably in the range of not higher than 20° C., more preferably in the range of not higher than 15° C., further preferably in the range of not higher than 10° C., and most preferably in the range of not higher than 5° C.

Two or more undercoating layers can be provided on the support.

[Anti-reflection Layers]

The optical filter can have an anti-reflection layer, which gives a reflectance preferably in the range of not more than 3.0%, more preferably in the range of not more than 1.8%.

As the anti-reflection layer, a low refractive index layer is essential. The refractive index of the low refractive index layer is lower than that of the support, and is preferably in the range of 1.20 to 1.55 (more preferably, 1.30 to 1.55).

The low refractive index layer preferably has a thickness of 50 to 400 nm, more preferably 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702 and 7(1995)-168004), a layer formed by sol-gel method (disclosed in Japanese Patent Provisional Publication Nos. 5(1993)-208811, 6(1994)-299091 and 7(1995)-168003), and a layer containing fine particles (disclosed in Japanese Patent Publication No. 60(1985)-59250, and Japanese Patent Provisional Publication Nos. 5(1993)-13021, 6(1994)-56478, 7(1995)-92306 and 9(1997)-288201). The low refractive index layer containing fine particles may further contain micro voids among the particles. The void ratio in that layer is preferably in the range of 3 to 50 vol. %, more preferably in the range of 5 to 35 vol. %.

Besides the low refractive index layer, layers having higher refractive indexes (i.e., middle and high refractive index layers) are preferably provided to reduce the reflection in a wide wavelength region.

The high refractive index layer has a refractive index preferably in the range of 1.65 to 2.40, more preferably in the range of 1.70 to 2.20. The middle refractive index layer has a refractive index between those of the low and high refractive index layers. The refractive index is preferably in the range of 1.50 to 1.90.

Each of the middle and high refractive index layers has a thickness preferably in the range of 5 nm to 100 $\mu$m, more preferably in the range of 10 nm to 10 $\mu$m, and most preferably in the range of 30 nm to 1 $\mu$m. The haze of each layer is in the range of preferably not more than 5%, more preferably not more than 3%, further preferably not more than 1%.

The middle and high refractive index layers can be formed from a binder polymer having a relatively high refractive index. Examples of that binder polymer include polystyrene, styrene copolymer, polycarbonate, melamine resin, phenol resin, epoxy resin, and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80. As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide, and zinc sulfide. Preferred materials are titanium oxide, tin oxide, and zirconium oxide. The inorganic fine particles may contain other elements, as well as those oxides or sulfides of main component. The "main component" here means the component contained in the largest content (wt. %). Examples of the other elements include Ti, Zr, Sn, Sb, Cu, Fe, Mn, Pb, Cd, As, Cr, Hg, Zn, Al, Mg, Si, P, and S.

The middle and high refractive index layers may be formed from liquid or soluble film-formable inorganic materials. Examples of the materials include alkoxides of various elements, salts of organic acids, coordination compounds (e.g., chelate compounds), and active inorganic polymers.

The surface of the anti-reflection layer can be made to show anti-glare performance (which prevents the surface from reflecting the surrounding scene by scattering the incident light). For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

[Electromagnetic Shielding Layer]

The optical filter can have an electromagnetic shielding layer which has a surface resistance in the range of 0.1 to 500 $\Omega/m^2$, preferably 0.1 to 10 $\Omega/m^2$. Since the electromagnetic shielding layer is placed on the optical filter, it is preferred to be transparent. Known transparent electroconductive layers can be used as the electromagnetic shielding layer.

As the transparent electroconductive layer, a thin film of metal or metal oxide is preferably used. Preferred metals are noble metals (gold, silver, palladium and alloy thereof), and alloy of gold and silver is particularly preferred. The alloy contains silver preferably in an amount of not less than 60 wt. %. Examples of preferred metal oxide include $SnO_2$, ZnO, ITO and $In_2O_3$.

The thin metal oxide film may be superposed on the thin metal film. If so, the metal oxide film protects the metal film from oxidization, and consequently improves the transmittance for visible light. Preferred metal oxides for the superposed film are oxides of 2 to 4-valent metals (e.g., zirconium oxide, titanium oxide, magnesium oxide, silicone oxide, aluminum oxide). Further, a thin film of metal alkoxide compound can be also superposed on the thin metal film. The thin films of metal oxide or metal alkoxide compound can be provided on both sides of the metal film. In that case, the thin metal oxide or metal alkoxide compound films on both sides may be different from each other.

The thin metal film has a thickness of preferably 4 to 40 nm, more preferably 5 to 35 nm, most preferably 6 to 30 nm.

The thin metal oxide or metal alkoxide compound film has a thickness of preferably 20 to 300 nm, more preferably 40 to 100 nm.

The electromagnetic shielding layer can be formed by spattering method, vacuum deposition method, ion plating method, plasma CVD method or plasma PVD method. The layer can be also formed by applying a coating liquid dispersing particles of metal or metal oxide.

[Other Layers]

The optical filter can further comprise a hard coating layer, a slippery layer, an anti-stain layer, an antistatic layer, a UV absorbing layer or an intermediate layer.

The hard coating layer preferably contains a cross-linked polymer, and can be formed from acrylic, urethane or epoxy polymer or oligomer (e.g., UV curable resin) or silica material.

On the top surface of the optical filter, a slippery layer may be provided. The slippery layer gives slipperiness to the surface of the optical filter, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

An anti-stain layer can be formed from a fluorine-containing polymer. The thickness of the anti-stain layer is preferably in the range of 2 to 100 nm, more preferably in the range of 5 to 30 nm.

The layers such as the anti-reflection layers (middle, high, and low refractive index layers), the filter layer, the undercoating layer, the hard coating layer, the slippery layer and other layers can be formed by known coating methods. Examples of the coating method include dip coating, air knife coating, curtain coating, roller coating, wire bar coating, gravure coating, and extrusion coating with a hopper (described in U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and "Coating Engineering" pp. 253, written by Y. Harazaki, published by Asakura Shoten (1973).

[Use of Optical Filter]

The optical filter of the invention can be applied on a display device such as a liquid crystal display (LCD), a plasma display panel (PDP), an electroluminescence display (ELD) or a cathode ray tube display (CRT). In the case that the optical filter has an anti-reflection layer, the optical filter is so arranged on the device that the surface opposite to the low refractive index layer is attached to the display surface. The optical filter of the invention is particularly effective in a plasma display panel (PDP).

A plasma display panel (PDP) comprises gas, glass substrates (front and back glass substrates), electrodes, electrode-lead member, thick film printing member, and phosphor. Each of the glass substrates is equipped with the electrode and an insulating layer. On the back glass substrate, a phosphor layer is further provided. The gas is enclosed between the substrates.

A plasma display panel (PDP) is commercially available, and is described in Japanese Patent Provisional Publication Nos. 5(1993)-205643 and 9(1997)-306366.

The layers of the optical filter of the invention are formed by spattering method, vacuum deposition method, ion plating method, plasma CVD method or plasma PVD method.

EXAMPLE 1

(Preparation of Optical Filter)

Both surfaces of a biaxially stretched transparent polyethylene terephthalate film (thickness: 175 µm) were subjected to corona discharge treatment, and latex of styrene-butadiene copolymer (refractive index: 1.55, glass transition temperature: 37° C.) [LX407C5, Nippon Zeon Co., Ltd.] was applied on both surfaces to form undercoating layers (dry thicknesses: 300 nm and 150 nm).

To 180 g of 10 wt. % gelatin aqueous solution, 1 N sodium hydroxide aqueous solution was added to adjust the pH value at 7. To the solution, 17 mg/m$^2$ of cyanine dye (I-3) and 32 mg/m$^2$ of cyanine dye (II-6) were added and stirred for 24 hours at 30° C. The thus-prepared coating solution was applied on the undercoating layer having 300 nm thickness, and dried for 10 minutes at 120° C. to form a filter layer (thickness: 3.5 µm). Thus, an optical filter was prepared.

(Measurement of Absorbance)

The absorption spectrum of the prepared optical filter was measured. The optical filter had absorption maximums at 594 nm and 940 nm. The transmittances at 594 nm and 940 nm were 3% and 5%, respectively. The half width of the absorption peak at 594 nm was 37 nm. The cyanine dye (I-3) in methanol had an absorption maximum ($\lambda_{max}$) at 510 nm, while the cyanine dye (II-6) in methanol had an absorption maximum ($\lambda_{max}$) at 772 nm.

EXAMPLE 2

The procedure of Example 1 was repeated except that 20 mg/m$^2$ of the cyanine dye (I-26) and 15 mg/m$^2$ of the cyanine dye (II-1) were used, to prepare an optical filter.

The absorption spectrum of the prepared optical filter was measured. The optical filter had absorption maximums at 595 nm and 910 nm. The transmittances at 595 nm and 910 nm were 9% and 7%, respectively. The half width of the absorption peak at 595 nm was 39 nm. The cyanine dye (I-26) in methanol had an absorption maximum ($\lambda_{max}$) at 539 nm, while the cyanine dye (II-1) in water had an absorption maximum ($\lambda_{max}$) at 720 nm.

EXAMPLE 3

The procedure of Example 1 was repeated except that 20 mg/m$^2$ of the cyanine dye (I-26) and 16 mg/m$^2$ of the oxonol dye (III-1) were used, to prepare an optical filter.

The absorption spectrum of the prepared optical filter was measured. The optical filter had absorption maximums at 595 nm and 780 nm. The transmittances at 595 nm and 780 nm were 9% and 9%, respectively. The half width of the absorption peak at 595 nm was 39 nm. The oxonol dye (III-1) in DMF had an absorption maximum ($\lambda_{max}$) at 619 nm.

EXAMPLE 4

The procedure of Example 1 was repeated except that 20 mg/m$^2$ of the cyanine dye (I-26) and 25 mg/m$^2$ of the cyanine dye (II-5) were used, to prepare an optical filter.

The absorption spectrum of the prepared optical filter was measured. The optical filter had absorption maximums at 595 nm and 816 nm. The transmittances at 595 nm and 816 nm were 9% and 13%, respectively. The half width of the absorption peak at 595 nm was 39 nm. The cyanine dye (II-5) in water had an absorption maximum ($\lambda_{max}$) at 717 nm.

EXAMPLE 5

The procedure of Example 1 was repeated except that 20 mg/m$^2$ of the cyanine dye (I-26), 16 mg/m$^2$ of the oxonol dye (III-1), 25 mg/m$^2$ of the cyanine dye (II-5) and 32 mg/m$^2$ of the cyanine dye (II-6) were used, to prepare an optical filter.

The absorption spectrum of the prepared optical filter was measured. The optical filter had absorption maximums at 595 nm, 780 nm, 816 nm and 940 nm. The transmittances at 595 nm, 780 nm, 816 nm and 940 nm were 9%, 9%, 13% and 5%, respectively. The half width of the absorption peak at 595 nm was 39 nm.

Comparison Example 1

The procedure of Example 1 was repeated except that only the cyanine dye (I-26) was used to prepare an optical filter.

Comparison Example 2

The procedure of Example 1 was repeated except that no dye was used to prepare an optical filter.
(Evaluation of Optical Filters)

A surface film and a front plate were removed from a commercially available plasma display panel (PDS4202J-H, Fujitsu Limited). Each of the optical filters prepared in Examples was directly attached to the display surface with an adhesive. The contrast and brightness of the displayed image were measured, and the color reproducibility (white and red) was also observed by the eye. Further, a remote-controlled TV set was placed in front of the display panel, and it was tested whether the display panel caused faulty working of the TV set (+) or not (−). The results are set forth in Table 1.

TABLE 1

| Optical filter | Contrast | Dyes 560–620 | Dyes 700–1200 | Reproducibility White | Reproducibility Red | Faulty working |
|---|---|---|---|---|---|---|
| Ex. 1 | 15:1 | (I-3) | (II-6) | White | Red | — |
| Ex. 2 | 15:1 | (I-26) | (II-1) | White | Red | — |
| Ex. 3 | 15:1 | (I-26) | (III-1) | White | Red | — |
| Ex. 4 | 15:1 | (I-26) | (II-5) | White | Red | — |
| Ex. 5 | 15:1 | (I-26) | (III-1) (II-5) (II-6) | White | Red | — |
| Comp. 1 | 15:1 | (I-26) | None | White | Red | + |
| Comp. 2 | 10:1 | None | None | White* | Red** | + |

Remark:
White*) slightly greenish white
Red**) slightly orangy red

EXAMPLE 6

A filter layer was formed from 17 mg/m$^2$ of the cyanine dye (I-3) in the same manner as Example 1 (the first filter layer). On the thus-formed first filter layer, another filter layer (the second filter layer) was formed from 32 mg/m$^2$ of the cyanine dye (II-6) in the same manner as Example 1.

Thus, an optical filter was prepared. The prepared optical filter was evaluated in the above-described manner, and thereby it was confirmed that the optical filter gave the same performance as that of Example 1.

EXAMPLE 7
(Preparation of Optical Filter)

Both surfaces of a biaxially stretched transparent polyethylene terephthalate film (thickness: 175 µm) were subjected to corona discharge treatment, and latex of styrene-butadiene copolymer (refractive index: 1.55, modulus of elasticity at 25° C.: 100 MPa, glass transition temperature: 37° C.) [LX407C5, Nippon Zeon Co., Ltd.] was applied on both surfaces to form undercoating layers (dry thicknesses: 300 nm and 150 nm).

An aqueous gelatin solution containing acetic acid and glutaric aldehyde was coated on the undercoating layer having the dry thickness of 300 nm to form a second undercoating layer (dry thickness: 100 nm).

An acrylic latex (refractive index: 1.50, modulus of elasticity at 25° C.: 120 MPa, glass transition temperature: 50° C.) [HA16, Japan Acryl Co., Ltd.] was coated on the undercoating layer having the dry thickness of 150 nm to form another second undercoating layer (dry thickness: 20 nm)

To 2.50 g of a reactive fluorocarbon polymer (JN-7219, JSR Co., Ltd.), 1.3 g of t-butanol was added. The mixture was stirred at the room temperature for 10 minutes, and then filtered through a polypropylene filter (porosity size: 1 µm) to prepare a coating solution for a low refractive index layer. The coating solution was applied on the second undercoating layer having the dry thickness of 20 nm to form a layer (dry thickness: 96 nm). The layer was dried and hardened at 120° C. for 15 minutes to form a low refractive index layer.

To 180 g of 10 wt. % gelatin aqueous solution, 0.05 g of the dye (ab-3) and 0.05 g of the dye (III-1) were added and stirred for 30 minutes at 40° C. The solution was filtered through a polypropylene filter (porosity size: 2 µm) to prepare a coating solution for a filter layer. The coating solution was coated on the second undercoating layer having the dry thickness of 100 nm, and dried for 10 minutes at 120° C. to form a filter layer (thickness: 3.5 µm). Thus, an optical filter was prepared.
(Measurement of Absorbance)

The absorption spectrum of the prepared optical filter was measured. The optical filter had absorption maximums at 586 nm and 780 nm. The transmittance at 586 nm was 9%. The half width of the absorption peak at 586 nm was 30 nm.
(Preparation of Front Plate)

Silver was spattered on a colorless transparent tempered glass plate (thickness: 3 mm) to form a silver membrane (surface resistance: 2.2 Ω per square, thickness: 13 nm). On the silver membrane, each of MgF$_2$, SiO$_2$, TiO$_2$ and then MgF$_2$ in order was evaporated in vacuum to form the four membranes, each of which has the optical thickness (the product of the refractive index and the thickness) of 130 to 140 nm. The average reflection ratio of the formed membranes was 0.6% within the wavelength range of 500 to 600 nm.

The filter layer of the optical filter was attached to the surface of the glass plate (on which the inorganic membranes were not formed) by using an acrylic adhesive (thickness: 30 µm) to form a front plate.

EXAMPLE 8
(Preparation of Front Plate)

Each of TiO$_2$, silver, TiO$_2$, silver and then TiO$_2$ was spattered on a colorless transparent tempered glass plate (thickness: 3 mm) to form five inorganic membranes (thickness: 21, 13, 50, 13 and 21 nm respectively). The surface resistance was 1.9 Ω per square. The average reflection ratio of the formed membranes was 1.0% within the wavelength range of 500 to 600 nm.

The filter layer of the optical filter prepared in Example 7 was attached to the surface of the glass plate (on which the inorganic membranes were not formed) by using an acrylic adhesive (thickness: 30 μm) to form a front plate.

EXAMPLE 9
(Preparation of Optical Filter)

Two undercoating layers, two second undercoating layers and a low refractive index layer were coated on a transparent support in the same manner as in Example 7.

To 180 g of 10 wt. % gelatin aqueous solution, 0.05 g of the dye (I-3), 0.15 g of the dye (a-2) and 0.05 g of the dye (III-1) were added and stirred for 30 minutes at 40° C. The solution was filtered through a polypropylene filter (porosity size: 2 μm) to prepare a coating solution for a filter layer. The coating solution was coated on the second undercoating layer having the dry thickness of 100 nm, and dried for 10 minutes at 120° C. to form a filter layer (thickness: 3.5 μm). Thus, an optical filter was prepared.

(Measurement of Absorbance)

The absorption spectrum of the prepared optical filter was measured. The optical filter had absorption maximums at 535 nm, 595 nm and 780 nm. The transmittance at 535 nm was 65%. The transmittance at 595 nm was 25%. The half width of the absorption peak at 535 nm was 63 nm. The half width of the absorption peak at 595 nm was 29 nm.

(Preparation of Front Plate)

A front plate was prepared in the same manner as in Example 8, except that the above-prepared optical filter was used.

(Evaluation of Optical Filters)

A front plate was removed from a commercially available plasma display panel (PDS4202J-H, Fujitsu Limited). Each of the front plates prepared in Examples 7 to 9 was attached to the display. The optical filter of the plate faced the display surface.

Inorganic membranes of the plates were electrically connected to a metallic ground attached to the back of the plasma display. The plasma display panel emits an electromagnetic wave, which induces a voltage at the inorganic membranes. The voltage is introduced into the metallic ground to evaluate the electromagnetic shielding function. Further, the infrared shielding function was evaluated. Furthermore, the contrast of the displayed image was measured, and the color reproducibility was observed by the eye.

Each of the front plates prepared in Examples 7 to 9 has an electromagnetic shielding function of 9 decibel or more at the frequency of 10 to 200 MHz. Each of the plates achieves the regulated leak level of the electromagnetic wave. Each of the front plates prepared in Examples 7 to 9 has an infrared shielding function of about 8% at 800 nm or less than 3% at 850 nm. Therefore, each of the plates can prevent the display panel from causing faulty working of an infrared remote controller.

The contrast of the displayed image was improved by using the front plate prepared in Example 7, 8 or 9. The contrast of the original display was 10:1, while the contrast of the display using the front plate prepared in Example 7, 8 or 9 was 15:1. Slightly orangy red in the original display was changed to pure red by using the front plate prepared in Example 7, 8 or 9. Greenish blue in the original display was changed to clear blue by using the front plate. Yellowish white in the original display was changed to pure white by using the front plate.

EXAMPLE 10
(Preparation of Optical Filter)

Both surfaces of a biaxially stretched transparent polyethylene terephthalate film (thickness: 175 μm) were subjected to corona discharge treatment, and latex of styrene-butadiene copolymer (refractive index: 1.55, modulus of elasticity at 25° C.: 100 MPa, glass transition temperature: 37° C.) [LX407C5, Nippon Zeon Co., Ltd.] was applied on both surfaces to form undercoating layers (dry thicknesses: 300 nm and 200 nm).

An acrylic latex (refractive index: 1.50, modulus of elasticity at 25° C.: 120 MPa, glass transition temperature: 50° C.) [HA16, Japan Acryl Co., Ltd.] was coated on the undercoating layer having the dry thickness of 200 nm to form a second undercoating layer (dry thickness: 50 nm).

A solution of dipentaerythritol hexaacrylate was coated on the second undercoating-layer. The coated layer was irradiated with ultraviolet ray of 750 mJ/cm$^2$ by using a high pressure mercury lump to polymerize dipentaerythritol hexaacrylate to form a hard coating layer (dry thickness: 10 μm).

Each of $TiO_2$, silver, $TiO_2$, silver and then $TiO_2$ was spattered on the hard coating layer to form five inorganic membranes (thickness: 22, 13, 51, 14 and 21 nm respectively). The surface resistance was 2.0 Ω per square. The average reflection ratio of the formed membranes was 1.1% within the wavelength range of 500 to 600 nm.

An aqueous gelatin solution containing acetic acid and glutaric aldehyde was coated on the undercoating layer having the dry thickness of 300 nm to form a second undercoating layer (dry thickness: 100 nm).

To 180 g of 10 wt. % gelatin aqueous solution, 0.05 g of the dye (ab-3) and 0.05 g of the dye (III-1) were added and stirred for 30 minutes at 40° C. The solution was filtered through a polypropylene filter (porosity size: 2 μm) to prepare a coating solution for a filter layer. The coating solution was coated on the second undercoating layer having the dry thickness of 100 nm, and dried for 10 minutes at 120° C. to form a filter layer (thickness: 3.5 μm). Thus, an optical filter was prepared.

(Measurement of Absorbance)

The absorption spectrum of the prepared optical filter was measured. The optical filter had absorption maximums at 585 nm and 780 nm. The transmittance at 585 nm was 7%. The half width of the absorption peak at 585 nm was 29 nm.

EXAMPLE 11
(Preparation of Optical Filter)

Two undercoating layers, two second undercoating layers and five inorganic membranes were formed on a transparent support in the same manner as in Example 10.

To 180 g of 10 wt. % gelatin aqueous solution, 0.05 g of the dye (I-3), 0.15 g of the dye (a-2) and 0.05 g of the dye (III-1) were added and stirred for 30 minutes at 40° C. The solution was filtered through a polypropylene filter (porosity size: 2 μm) to prepare a coating solution for a filter layer. The coating solution was coated on the second undercoating layer having the dry thickness of 100 nm, and dried for 10 minutes at 120° C. to form a filter layer (thickness: 3.5 μm). Thus, an optical filter was prepared.

(Measurement of Absorbance)

The absorption spectrum of the prepared optical filter was measured. The optical filter had absorption maximums at 535 nm, 595 nm and 780 nm. The transmittance at 535 nm was 64%. The transmittance at 595 nm was 23%. The half width of the absorption peak at 535 nm was 62 nm. The half width of the absorption peak at 595 nm was 29 nm.

(Evaluation of Optical Filters)

A front plate was removed from a commercially available plasma display panel (PDS4202J-H, Fujitsu Limited). Each of the optical filters prepared in Examples 10 to 11 was directly attached to the display surface by using an acrylic adhesive (thickness: 30 μm). The filter layer of the optical filter faces the display surface.

Inorganic membranes of the filters were electrically connected to a metallic ground attached to the back of the plasma display. The plasma display panel emits an electromagnetic wave, which induces a voltage at the inorganic membranes. The voltage is introduced into the metallic ground to evaluate the electromagnetic shielding function. Further, the infrared shielding function was evaluated. Furthermore, the contrast of the displayed image was measured, and the color reproducibility was observed by the eye.

Each of the optical filters prepared in Examples 10 and 11 has an electromagnetic shielding function of 9 decibel or more at the frequency of 10 to 200 MHz. Each of the filters achieves the regulated leak level of the electromagnetic wave. Each of the optical filters prepared in Examples 10 and 11 has an infrared shielding function of about 9% at 800 nm or less than 4% at 850 nm. Therefore, each of the filters can prevent the display panel from causing faulty working of an infrared remote controller.

The contrast of the displayed image was improved by using the optical filters prepared in Example 10 or 11. The contrast of the display without the front panel was 6:1, while the contrast of the display using the optical filter prepared in Example 10 or 11 was 12:1. Slightly orangy red in the original display without the front panel was changed to pure red by using the optical filter prepared in Example 10 or 11. Greenish blue in the display without the front panel was changed to clear blue by using the optical filter. Yellowish white in the display without the front panel was changed to pure white by using the optical filter.

EXAMPLE 12

The procedure of Example 1 was repeated except that 34.5 mg/m² of the following dye (d), 17.3 mg/m² of the dye (a-2), 10 mg/m² of the dye (I-26), 43 mg/m² of the dye (III-3), 90 mg/m² of the dye (II-1) and 40 mg/m² of the dye (II-3) were used, to prepare an optical filter.

Dye (d)

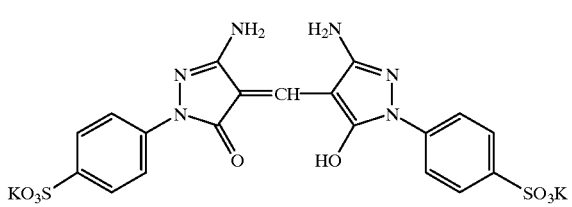

Figure 7:
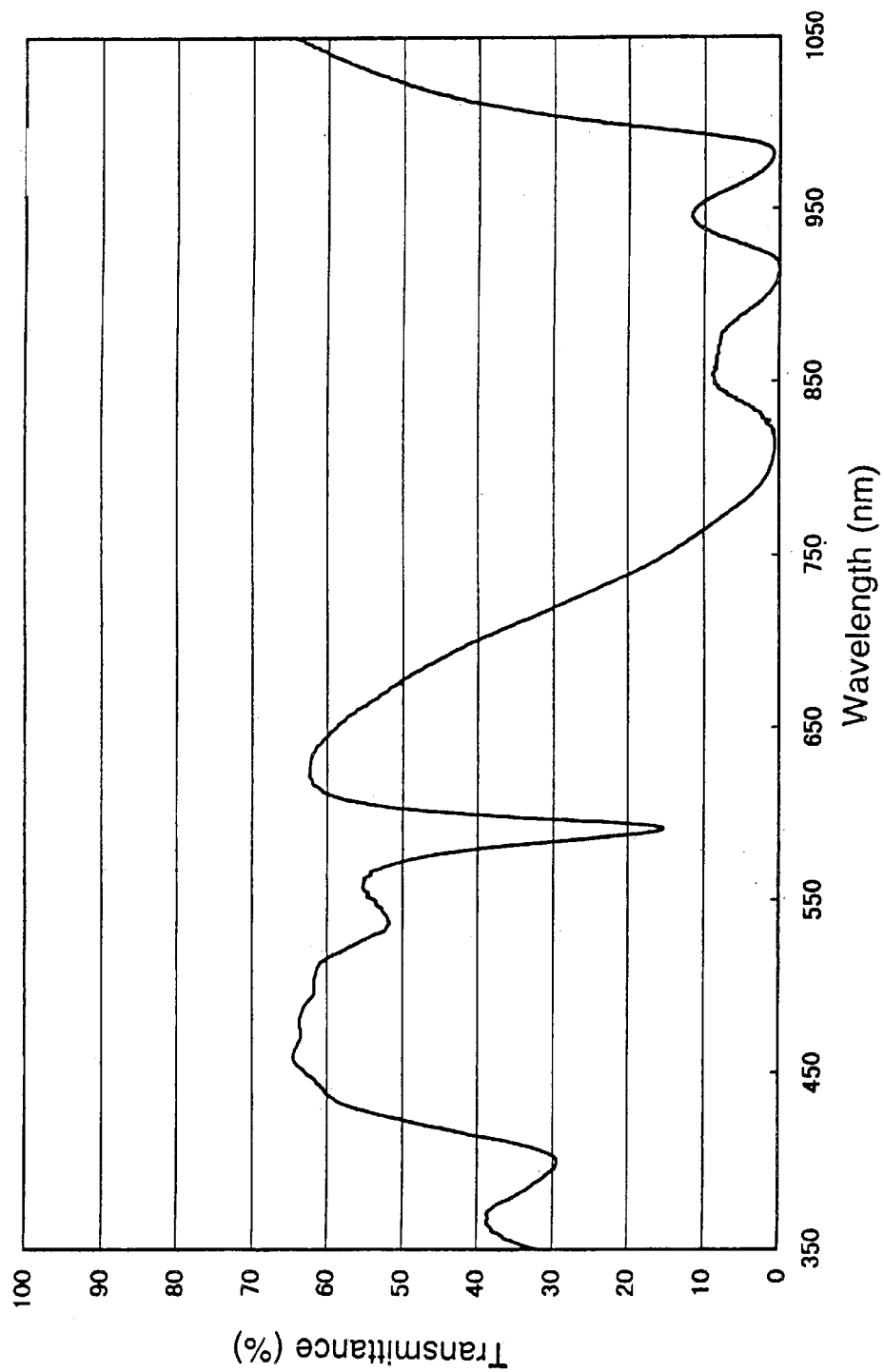
FIG. 7 is a graph showing the spectral transmittance of the optical filter prepared in Example 12.

The absorption spectrum of the prepared optical filter was measured. The optical filter had absorption maximums at 400 nm (transmittance: 29%), 534 nm (53%), 592 nm (16%), 810 (1%), 914 nm (0%) and 982 nm (2%). The spectral transmittance is shown in FIG. 7.

What is claimed is:

1. An optical filter which comprises a transparent support and at least one filter layer, wherein the filter layer has an absorption maximum in the wavelength region of 560 to 620 nm and another absorption maximum in the wavelength region of 700 to 1,200 nm, and wherein the filter layer contains a pentamethine cyanine dye, a heptamethine cyanine dye, a nonamethine cyanine dye or an oxonol dye in an aggregated form and a binder polymer, said dye having the absorption maximum in the wavelength region of 700 to 1,200 nm.

2. The optical filter as defined in claim 1, wherein the filter layer further contains a trimethine cyanine dye in an aggregated form, said cyanine dye having the absorption maximum in the wavelength region of 560 to 620 nm.

3. The optical filter as defined in claim 1, wherein the transparent support is made of a polymer film.

4. A plasma display panel having a display surface covered with an optical filter, wherein the optical filter comprises a transparent support and at least one filter layer, wherein the filter layer has an absorption maximum in the wavelength region of 560 to 620 nm and another absorption maximum in the wavelength region of 700 to 1,200 nm, and wherein the filter layer contains a pentamethine cyanine dye, a heptamethine cyanine dye, a nonamethine cyanine dye or an oxonol dye in an aggregated form and a binder polymer, said dye having the absorption maximum in the wavelength region of 700 to 1,200 nm.

5. The plasma display panel as defined in claim 4, wherein the optical filter is directly attached to the display surface.

6. An optical filter which comprises a transparent support, a first filter layer and a second filter layer, said first filter layer having an absorption maximum in the wavelength region of 560 to 620 nm, and said second filter layer having an absorption maximum in the wavelength region of 700 to 1,200 nm, wherein each of the two filter layers contains a dye and a binder polymer and wherein the second filter layer contains a pentamethine cyanine dye, a heptamethine cyanine dye, a nonamethine cyanine dye or an oxonol dye in an aggregated form, said dye having the absorption maximum in the wavelength region of 700 to 1,200 nm.

7. The optical filter as defined in claim 6, wherein the first filter layer contains a trimethine cyanine dye in an aggregated form, said cyanine dye having the absorption maximum in the wavelength region of 560 to 620 nm.

8. A plasma display panel having a display surface covered with an optical filter, wherein the optical filter comprises a transparent support, a first filter layer and a second filter layer, said first filter layer having an absorption maximum in the wavelength region of 560 to 620 nm, and said second filter layer having an absorption maximum in the wavelength region of 700 to 1,200 nm, wherein each of the two filter layers contains a dye and a binder polymer and wherein the second filter layer contains a pentamethine cyanine dye, a heptamethine cyanine dye, a nonamethine cyanine dye or an oxonol dye in an aggregated form, said dye having the absorption maximum in the wavelength region of 700 to 1,200 nm.

9. The plasma display panel as defined in claim 8, wherein the optical filter is directly attached to the display surface.

* * * * *